US012519206B2

(12) United States Patent
Li

(10) Patent No.: US 12,519,206 B2
(45) Date of Patent: Jan. 6, 2026

(54) ELECTRONIC DEVICE

(71) Applicant: Honor Device Co., Ltd., Shenzhen (CN)

(72) Inventor: Yuanpeng Li, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 368 days.

(21) Appl. No.: 18/029,489

(22) PCT Filed: Feb. 9, 2022

(86) PCT No.: PCT/CN2022/075717
§ 371 (c)(1),
(2) Date: Mar. 30, 2023

(87) PCT Pub. No.: WO2022/222580
PCT Pub. Date: Oct. 27, 2022

(65) Prior Publication Data
US 2024/0014541 A1 Jan. 11, 2024

(30) Foreign Application Priority Data
Apr. 19, 2021 (CN) ........................ 202110420862.X

(51) Int. Cl.
*H01Q 1/22* (2006.01)
*H01Q 1/00* (2006.01)
(Continued)

(52) U.S. Cl.
CPC ........... *H01Q 1/2216* (2013.01); *H01Q 1/002* (2013.01); *H01Q 1/273* (2013.01); *H01Q 1/38* (2013.01)

(58) Field of Classification Search
CPC ...... H01Q 1/2216; H01Q 1/002; H01Q 1/273; H01Q 1/38; H01Q 1/42; H01Q 7/00;
(Continued)

(56) References Cited

U.S. PATENT DOCUMENTS 10,236,557 B2 3/2019 Orihara et al.
10,389,009 B2 8/2019 Lee et al.
(Continued)

FOREIGN PATENT DOCUMENTS

CN 103779647 A 5/2014
CN 104737371 A 6/2015
(Continued)

OTHER PUBLICATIONS

Chen, Juan, "Small area NFC antenna design," Foreign electronic measurement technology, vol. 39, No. 4, pp. 144-148 (Apr. 2020).
(Continued)

*Primary Examiner* — Fayyaz Alam
(74) *Attorney, Agent, or Firm* — Leydig, Voit & Mayer, Ltd.

(57) ABSTRACT

An electronic device is provided. The electronic device comprises an NFC antenna and a metal member. The NFC antenna includes an NFC coil, and the metal member is located on the side of a plane in which the NFC coil is located. The NFC coil includes a first part and a second part that are arranged along a circumferential direction of the NFC coil, the first part is located outside an orthographic projection that is of the metal member and that is on the plane in which the NFC coil is located, and the second part passes through the orthographic projection that is of the metal member and that is on the plane in which the NFC coil is located.

20 Claims, 21 Drawing Sheets

(51) Int. Cl.
*H01Q 1/27* (2006.01)
*H01Q 1/38* (2006.01)

(58) Field of Classification Search
CPC ........ H01Q 1/2208; H01Q 1/52; H01Q 1/243; H04B 5/26; H04B 5/43; H04B 5/72
See application file for complete search history.

(56) References Cited

U.S. PATENT DOCUMENTS

| | | | | |
|---|---|---|---|---|
| 10,396,435 | B2 | 8/2019 | Komachi et al. | |
| 11,450,947 | B2 | 9/2022 | Noh | |
| 11,876,305 | B2 | 1/2024 | Ito et al. | |
| 2005/0060011 | A1 | 3/2005 | Denker et al. | |
| 2014/0002313 | A1 | 1/2014 | Yang et al. | |
| 2014/0011447 | A1 | 1/2014 | Konanur et al. | |
| 2014/0111389 | A1 | 4/2014 | Jung | |
| 2016/0079669 | A1 | 3/2016 | Guo et al. | |
| 2016/0197402 | A1* | 7/2016 | Lee | H01Q 7/06 343/788 |
| 2017/0077597 | A1 | 3/2017 | Gong et al. | |
| 2017/0331173 | A1 | 11/2017 | Ju et al. | |
| 2017/0346163 | A1 | 11/2017 | Lee et al. | |
| 2019/0020101 | A1* | 1/2019 | Maeng | H01Q 1/362 |
| 2019/0236432 | A1* | 8/2019 | Orihara | H04B 5/48 |
| 2021/0098862 | A1* | 4/2021 | Noh | H01Q 7/00 |
| 2021/0149347 | A1 | 5/2021 | Liu | |
| 2021/0159587 | A1* | 5/2021 | Lee | H01Q 1/243 |
| 2022/0190478 | A1 | 6/2022 | Mukai et al. | |

FOREIGN PATENT DOCUMENTS

| | | | |
|---|---|---|---|
| CN | 204516899 | U | 7/2015 |
| CN | 106033832 | A | 10/2016 |
| CN | 106981716 | A | 7/2017 |
| CN | 107437650 | A | 12/2017 |
| CN | 107453022 | A | 12/2017 |
| CN | 207368220 | U | 5/2018 |
| CN | 110581362 | A | 12/2019 |
| CN | 111342228 | A | 6/2020 |
| CN | 210838088 | U | 6/2020 |
| CN | 111462998 | A | 7/2020 |
| CN | 211629289 | U | 10/2020 |
| CN | 112003967 | A | 11/2020 |
| CN | 112038773 | A | 12/2020 |
| CN | 112042052 | A | 12/2020 |
| CN | 112119357 | A | 12/2020 |
| CN | 113258286 | A | 8/2021 |
| WO | 2015030335 | A1 | 3/2015 |
| WO | 2021049516 | A1 | 3/2021 |
| WO | 2021049517 | A1 | 3/2021 |

OTHER PUBLICATIONS

Wang, Meng-Shuang, "Research on Circularly Polarized Antennas and Shared-Aperture Circularly Polarized / Near-Field Coupling Antennas," Nanjing University of Science and Technology, total 122 pages (Jun. 2018).

Zhu et al., "A Useful Methodology to Convert the Smartphone Metal Cover Into an Antenna Booster for NFC Applications," IEEE Transactions on Antennas and Propagation, vol. 67, No. 7, pp. 4463-4473 (Jul. 2019).

* cited by examiner

ELECTRONIC DEVICE

CROSS-REFERENCE TO RELATED APPLICATIONS

This application is a national stage of International Application No. PCT/CN2022/075717, filed on Feb. 9, 2022, which claims priority to Chinese Patent Application No. 202110420862.X, filed on Apr. 19, 2021. The disclosures of both of the aforementioned applications are hereby incorporated by reference in their entireties.

TECHNICAL FIELD

This application relates to the technical field of electronic devices, and in particular, to an electronic device having an NFC antenna.

BACKGROUND

A near field communication (NFC) technology has a wide application prospect in many fields because it supports contactless data transmission between wireless electronic devices, and has advantages such as high security, low power consumption, and fast transaction.

In a conventional technology, a length of a coil of an NFC antenna (hereinafter referred to as an NFC coil) is large, and a headroom area required for the NFC coil in an electronic device is large. However, in a portable miniature electronic device and a wearable electronic device, such as a mobile phone and a smartwatch, layout space of the NFC coil in the electronic device is limited with the development of miniaturization, diversified functions, and high durability of the electronic device. A large-area metal member is generally present on a side that is of the NFC coil and that is used to transmit and receive radio frequency signals. For example, a decoration cover for protecting and decorating a camera module is mounted on one side that is of the NFC coil and that is used to transmit and receive radio frequency signals, and the decoration cover is a metal member. In this case, performance of the NFC antenna is seriously degraded due to the metal member, resulting in a difficulty for the electronic device in reading a card. Therefore, how to eliminate impact of the large-area metal member on the NFC antenna becomes an important research direction of each manufacturer.

SUMMARY

An embodiment of this application provides an electronic device, to reduce impact of a large-area metal member on an NFC antenna and ensure performance of the NFC antenna, so as to improve a success rate of reading a card.

To achieve the foregoing objective, the following technical solutions are used in embodiments of this application.

According to a first aspect, some embodiments of this application provide an electronic device, and the electronic device includes an NFC antenna and a metal member. The NFC antenna includes an NFC coil. The NFC coil includes a first side. The first side is one side of a plane in which the NFC coil is located. The metal member is located on the first side. The NFC coil includes a first part and a second part that are arranged along a circumferential direction of the NFC coil. The first part is located outside an orthographic projection that is of the metal member and that is on the plane in which the NFC coil is located, and is provided around the orthographic projection that is of the metal member and that is on the plane in which the NFC coil is located. The second part passes through the orthographic projection that is of the metal member and that is on the plane in which the NFC coil is located.

In this embodiment of this application, the NFC coil includes the first part and the second part that are arranged along the circumferential direction of the NFC coil. The first part is located outside the orthographic projection that is of the metal member and that is on the plane in which the NFC coil is located, and is provided around the orthographic projection that is of the metal member and that is on the plane in which the NFC coil is located. The second part passes through the orthographic projection that is of the metal member and that is on the plane in which the NFC coil is located. With the thinning design of the electronic device, a distance that is between the second part and the metal member and that is perpendicular to the plane in which the NFC coil is located generally smaller than a distance between the first part and an edge of the metal member. Therefore, a current induced in the metal member by the second part is greater than a current induced in the metal member by the first part. A magnetic field dead zone generated after a magnetic field generated by the NFC coil is canceled with a magnetic field generated by the metal member is transferred to an edge of an area enclosed by the NFC coil. Specifically, the magnetic field dead zone is transferred to an edge at which the second part is located. In this way, distribution uniformity of magnetic lines in an area enclosed by the NFC coil can be improved, and performance of the NFC antenna can be improved.

In a possible implementation of the first aspect, the metal member is provided with at least one through-hole. The "at least one" means one or more. The second part overlaps an orthographic projection that is of the through-hole and that is on the plane in which the NFC coil is located, so that the second part (312) is exposed. In this way, the second part of the NFC coil can be exposed through the through-hole, so that a magnetic field generated by the second part can be transmitted, through the through-hole, to a side that is of the metal member and that is away from the NFC coil. Correspondingly, the second part may also receive, through the through-hole, a magnetic field on the side that is of the metal member and that is away from the NFC coil. In this way, distribution uniformity of magnetic lines in an area enclosed by the NFC coil can be further improved, and performance of the NFC antenna can be improved.

In a possible implementation of the first aspect, a sum of lengths of through-holes provided in the metal member in an extension path parallel to the second part is less than a length of the metal member in the extension path parallel to the second part.

In a possible implementation of the first aspect, a sum of lengths of through-holes provided in the metal member in an extension path parallel to the second part is less than five-thousandths of a wavelength of the NFC antenna.

In a possible implementation of the first aspect, the through-holes are filled with an insulating material. The insulating material includes, but is not limited to, plastic, sponge, rubber, and silica gel, and this is not specifically limited herein. In this way, structural integrity or aesthetics of the metal member can be ensured.

In a possible implementation of the first aspect, the NFC coil further includes a third part and a fourth part arranged along the circumferential direction of the NFC coil. Along the circumferential direction of the NFC coil, the third part and the first part are respectively connected to two opposite ends of the second part, and the third part is located outside the orthographic projection that is of the metal member and that is on the plane in which the NFC coil is located, and is provided around the orthographic projection that is of the metal member and that is on the plane in which the NFC coil is located. Along the circumferential direction of the NFC coil, the second part and the fourth part are respectively connected to two opposite ends of the third part, and the fourth part passes through the orthographic projection that is of the metal member and that is on the plane in which the NFC coil is located. Therefore, after a magnetic field of the NFC coil and a magnetic field of the metal member cancel out, the formed dead zone is transferred to an edge at which the second part and the fourth part are located. In this way, distribution uniformity of magnetic lines in an area enclosed by the NFC coil can be improved, and performance of the NFC antenna can be improved.

In a possible implementation of the first aspect, the NFC coil further includes a second side, and the first side and the second side respectively are two opposite sides of the plane in which the NFC coil is located. The NFC antenna further includes a magnetic shielding sheet. The magnetic shielding sheet is provided on the second side of the NFC coil, the magnetic shielding sheet are stacked with the plane in which the NFC coil is located, an orthographic projection that is of the NFC coil and that is on the magnetic shielding sheet is located within the magnetic shielding sheet. The magnetic shielding sheet is configured to reduce magnetic field absorption of a metal structure (such as a middle plate) of a side that is of the magnetic shielding sheet and that is away from the NFC coil to the NFC coil. In addition, the magnetic shielding sheet can increase magnetic field strength of the first side, so that the NFC antenna has signal transmitting/receiving directionality, thereby increasing an electromagnetic induction distance.

In a possible implementation of the first aspect, the magnetic shielding sheet may be ferrite.

In a possible implementation of the first aspect, the magnetic shielding sheet may include at least one of magnetic materials such as Nd—Fe—B, samarium, Al—Ni—Co, Fe—Si—Al, and Ni—Fe. A shape of the magnetic shielding sheet includes, but is not limited to, a rectangle, a square, a triangle, a circle, an ellipse, or a polygon.

In a possible implementation of the first aspect, the electronic device further includes a circuit board, and the NFC coil is a metal layer provided on the circuit board. This ensures manufacturing accuracy of the NFC coil. A shape of the circuit board includes, but is not limited to, a rectangle, a square, a triangle, a circle, an ellipse, or a polygon.

In a possible implementation of the first aspect, the circuit board may be a rigid circuit board, may be a flexible circuit board, or may be a flexible-rigid circuit board. The circuit board may be an FR-4 dielectric plate, a Rogers dielectric plate, an FR-4 and Rogers mixed dielectric plate, or the like. FR-4 herein is a mark of a flame-resistant material level, and the Rogers dielectric plate is a high-frequency board.

In a possible implementation of the first aspect, the metal member is a camera decoration cover. The electronic device further includes a back cover, the metal member is mounted on the back cover, the NFC coil is located on an inner side of the back cover, and the inner side of the back cover is a side that is of the back cover and that faces internal accommodating space.

In a possible implementation of the first aspect, the metal member is a dial. The electronic device further includes a light-transmitting cover plate, the metal member and the NFC coil are located on an inner side of the light-transmitting cover plate, and the metal member is located between the NFC coil and the light-transmitting cover plate.

According to a second aspect, some embodiments of this application provide an electronic device, and the electronic device includes an NFC antenna and a metal member. The NFC antenna includes an NFC coil. The NFC coil is a plane coil, the NFC coil includes a first side, and the first side is one side of a plane in which the NFC coil is located. The metal member is located on the first side, the NFC coil includes a first part and a second part that are arranged along a circumferential direction of the NFC coil. The first part is located outside an orthographic projection that is of the metal member and that is on the plane in which the NFC coil is located, and is provided around the orthographic projection that is of the metal member and that is on the plane in which the NFC coil is located. The second part passes through the orthographic projection that is of the metal member and that is on the plane in which the NFC coil is located. The metal member is provided with a through-slot, the second part overlaps an orthographic projection that is of the through-slot and that is on the plane in which the NFC coil is located, so that the second part is exposed, and the through-slot penetrates through an edge of the metal member along at least one end of an extension path parallel to the second part.

In this embodiment of this application, the NFC coil includes the first part and the second part that are arranged along the circumferential direction of the NFC coil. The first part is located outside an orthographic projection that is of the metal member and that is on the plane in which the NFC coil is located, and is provided around the orthographic projection that is of the metal member and that is on the plane in which the NFC coil is located. The second part passes through the orthographic projection that is of the metal member and that is on the plane in which the NFC coil is located. With the thinning design of the electronic device, a distance that is between the second part and the metal member and that is perpendicular to the plane in which the NFC coil is located generally smaller than a distance between the first part and an edge of the metal member. Therefore, a current induced in the metal member by the second part is greater than a current induced in the metal member by the first part. A magnetic field dead zone generated after a magnetic field generated by the NFC coil is canceled with a magnetic field generated by the metal member is transferred to an edge of an area enclosed by the NFC coil. Specifically, the magnetic field dead zone is transferred to an edge at which the second part is located. In this way, distribution uniformity of magnetic lines in an area enclosed by the NFC coil can be improved, and performance of the NFC antenna can be improved. Further, the second part of the NFC coil can be exposed through the through-slot, so that a magnetic field generated by the second part can be transmitted, through the through-slot, to a side that is of the metal member and that is away from the NFC coil. Correspondingly, the second part may also receive, through the through-slot, a magnetic field on the side that is of the metal member and that is away from the NFC coil. In this way, distribution uniformity of magnetic lines in an area enclosed by the NFC coil can be further improved, and performance of the NFC antenna can be improved.

In a possible implementation of the second aspect, a sum of lengths of through-slots provided in the metal member in an extension path parallel to the second part is less than a length of the metal member in the extension path parallel to the second part.

In a possible implementation of the second aspect, a sum of lengths of through-slots provided in the metal member in an extension path parallel to the second part is less than five-thousandths of a wavelength of the NFC antenna.

In a possible implementation of the second aspect, the through-slots are filled with an insulating material. The insulating material includes, but is not limited to, plastic, sponge, rubber, and silica gel, and this is not specifically limited herein. In this way, structural integrity or aesthetics of the metal member can be ensured.

In a possible implementation of the second aspect, the NFC coil further includes a third part and a fourth part arranged along the circumferential direction of the NFC coil. Along the circumferential direction of the NFC coil, the third part and the first part are respectively connected to two opposite ends of the second part, and the third part is located outside the orthographic projection that is of the metal member and that is on the plane in which the NFC coil is located, and is provided around the orthographic projection that is of the metal member and that is on the plane in which the NFC coil is located. Along the circumferential direction of the NFC coil, the second part and the fourth part are respectively connected to two opposite ends of the third part, and the fourth part passes through the orthographic projection that is of the metal member and that is on the plane in which the NFC coil is located. Therefore, after a magnetic field of the NFC coil and a magnetic field of the metal member cancel out, the formed dead zone is transferred to an edge at which the second part and the fourth part are located. In this way, distribution uniformity of magnetic lines in an area enclosed by the NFC coil can be improved, and performance of the NFC antenna can be improved.

In a possible implementation of the second aspect, the NFC coil further includes a second side, and the first side and the second side respectively are two opposite sides of the plane in which the NFC coil is located. The NFC antenna further includes a magnetic shielding sheet. The magnetic shielding sheet is provided on the second side of the NFC coil, the magnetic shielding sheet are stacked with the plane in which the NFC coil is located, an orthographic projection that is of the NFC coil and that is on the magnetic shielding sheet is located within the magnetic shielding sheet. The magnetic shielding sheet is configured to reduce magnetic field absorption of a metal structure (such as a middle plate) of a side that is of the magnetic shielding sheet and that is away from the NFC coil to the NFC coil. In addition, the magnetic shielding sheet can increase magnetic field strength of the first side, so that the NFC antenna has signal transmitting/receiving directionality, thereby increasing an electromagnetic induction distance.

In a possible implementation of the second aspect, the magnetic shielding sheet may be ferrite.

In a possible implementation of the second aspect, the magnetic shielding sheet may include at least one of magnetic materials such as Nd—Fe—B, samarium, Al—Ni—Co, Fe—Si—Al, Ni—Fe, and the like. A shape of the magnetic shielding sheet includes, but is not limited to, a rectangle, a square, a triangle, a circle, an ellipse, or a polygon.

In a possible implementation of the second aspect, the electronic device further includes a circuit board, and the NFC coil is a metal layer provided on the circuit board. This ensures manufacturing accuracy of the NFC coil. A shape of the circuit board includes, but is not limited to, a rectangle, a square, a triangle, a circle, an ellipse, or a polygon.

In a possible implementation of the second aspect, the circuit board may be a rigid circuit board, may be a flexible circuit board, or may be a flexible-rigid circuit board. The circuit board may be an FR-4 dielectric plate, a Rogers dielectric plate, an FR-4 and Rogers mixed dielectric plate, or the like. FR-4 herein is a mark of a flame-resistant material level, and the Rogers dielectric plate is a high-frequency board.

In another possible implementation of the second aspect, the metal member is a camera decoration cover. The electronic device further includes a back cover, the metal member is mounted on the back cover, the NFC coil is located on an inner side of the back cover, and the inner side of the back cover is a side that is of the back cover and that faces internal accommodating space.

In a possible implementation of the second aspect, the metal member is a dial. The electronic device further includes a light-transmitting cover plate, the metal member and the NFC coil are located on an inner side of the light-transmitting cover plate, and the metal member is located between the NFC coil and the light-transmitting cover plate.

DESCRIPTION OF EMBODIMENTS

In embodiments of this application, terms "first", "second", "third" and "fourth" are used for descriptive purposes only, and cannot be construed as indicating or implying relative importance or implicitly indicating a quantity of indicated technical features. Therefore, features defined with "first", "second", "third" and "fourth" may explicitly or implicitly include one or more of the features.

In descriptions of this application, it should be understood that an orientation or positional relationship indicated by terms "center", "upper", "lower", "front", "rear", "left", "right", "vertical", "horizontal", "top", "bottom", "inner", "outer", and the like, is based on the orientation or positional relationship shown in accompanying drawings, and is only for ease of describing this application and simplifying the descriptions, rather than indicating or implying that an apparatus or a component referred to must have a specific orientation, be constructed and operated in a specific orientation, which therefore cannot be understood as a limitation to this application.

In embodiments of this application, terms "include", "comprise", or any other variant thereof is intended to cover non-exclusive inclusion, so that a process, a method, an article, or an apparatus that includes a series of elements includes not only those elements but also other elements that are not explicitly listed, or includes elements inherent to such a process, a method, an article, or an apparatus. Without more limitations, elements defined by the sentence "including one" does not exclude that there are still other same elements in the process, method, object, or apparatus which includes the element.

This application provides an electronic device, where the electronic device is a type of electronic device with a flexible screen. Specifically, the electronic device may be a portable electronic apparatus or another suitable electronic apparatus. For example, the electronic device may be a mobile phone, a tablet personal computer, a portable computer, a smart headset, a smart speaker, a smartwatch, a personal digital assistant (PDA), a POS (point of sales), or the like.

Figure 1:
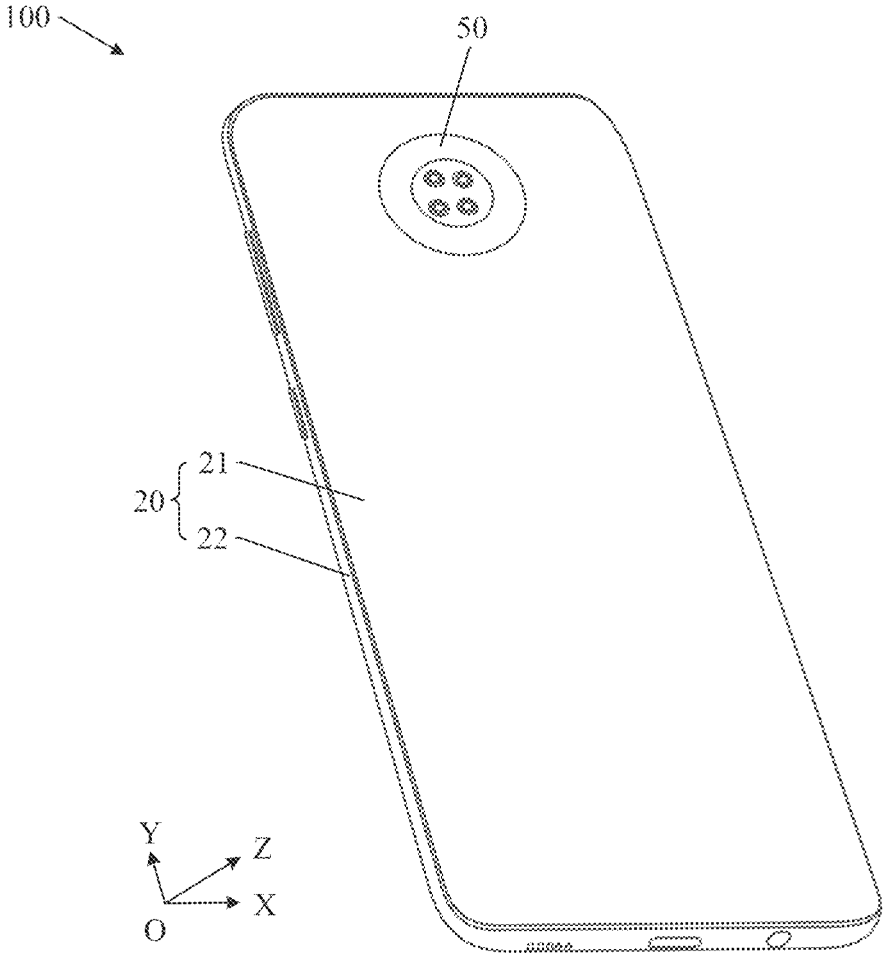
FIG. 1 is a perspective view of an electronic device according to some embodiments of this application.
Figure 2:
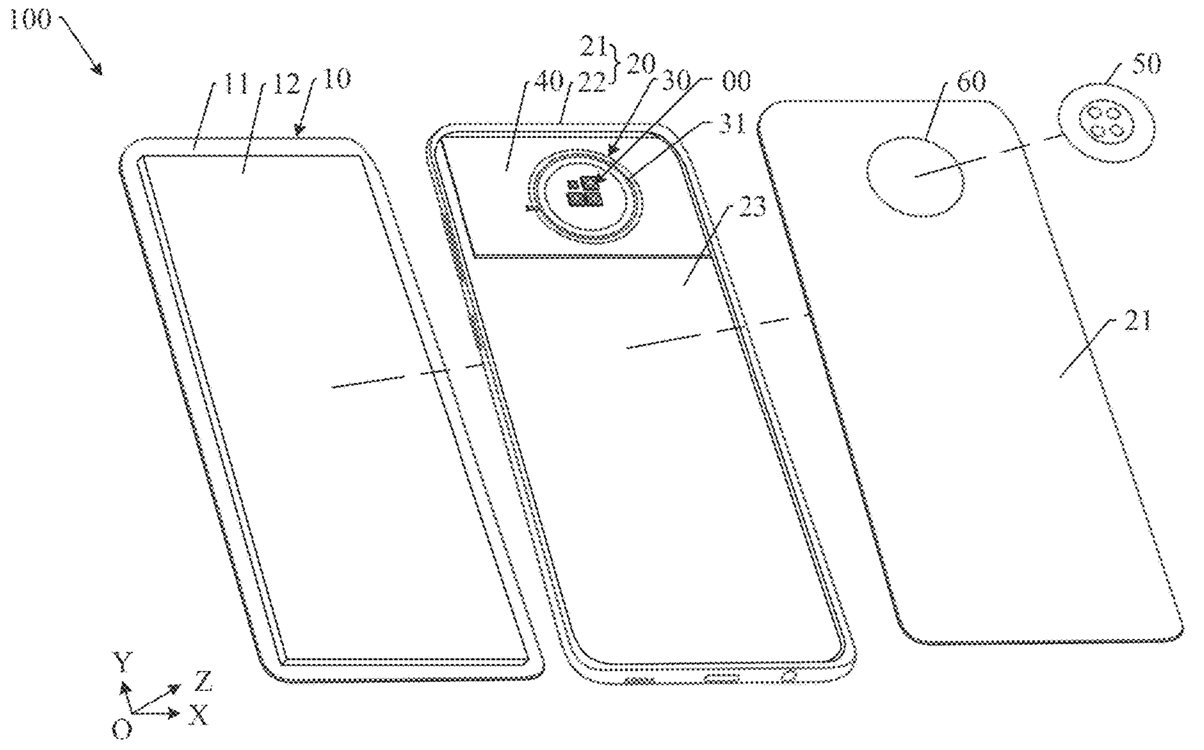
FIG. 2 is an exploded view of the electronic device shown in FIG. 1.

FIG. 1 is a perspective view of an electronic device 100 according to some embodiments of this application; and FIG. 2 is an exploded view of the electronic device 100 shown in FIG. 1. In this embodiment, the electronic device 100 is a mobile phone. The electronic device 100 includes a screen 10, a back housing 20, an NFC antenna 30, a mainboard and a metal member 50.

It may be understood that FIG. 1 and FIG. 2 schematically show only some components included in the electronic device 100. Actual shapes, actual sizes, actual locations, and actual constructions of these components are not limited by FIG. 1 and FIG. 2. In some other examples, the electronic device 100 may not include the screen 10, the back housing 20, and the mainboard 40.

The screen 10 is configured to display an image, a video, and the like. The screen includes a light-transmitting cover plate 11 and a display 12. The light-transmitting cover plate 11 and the display 12 are stacked and fixedly connected. The light-transmitting cover plate 11 is mainly configured to protect the display 12 and prevent dust. A material of the light-transmitting cover plate 11 includes, but is not limited to, glass. The display 12 may be a flexible display, or may be a rigid display. For example, the display 12 may be an organic light-emitting diode (OLED) display, an active-matrix organic light-emitting diode or an active-matrix organic light-emitting diode (AMOLED) display, a mini organic light-emitting diode display, a micro light-emitting diode display, a micro organic light-emitting diode display, a quantum dot light emitting diode (QLED) display, or a liquid crystal display (LCD).

The back housing 20 is configured to protect an internal electronic component of the electronic device 100. The back housing 20 includes a back cover 21 and a frame 22. The back cover 21 is made of a non-metallic material such as plastic or glass. The back cover 21 is located on a side that is of the display 12 and that is away from the light-transmitting cover plate 11, and is stacked with the light-transmitting cover plate 11 and the display 12. A material of the frame 22 includes, but is not limited to, metal and plastic. The frame 22 is located between the back cover 21 and the light-transmitting cover plate 11. The frame 22 is fastened to the back cover 21. For example, the frame 22 may be fastened to the back cover 21 by using adhesive. When both the frame 22 and the back cover 21 are made of the non-metallic material such as plastic, the frame 22 may be integrally formed with the back cover 21, in other words, the frame 22 and the back cover 21 are an integral structure. The light-transmitting cover plate 11 may be fastened to the frame 22 by using adhesive. The light-transmitting cover plate 11, the back cover 21, and the frame 22 enclose internal accommodating space of the electronic device 100. The internal accommodating space accommodates the display 12.

To facilitate the following description, a stacking direction of the light-transmitting cover plate 11, the display 12, and the back cover 21 in the electronic device 100 is defined as a Z axis direction. A plane parallel to the light-transmitting cover plate 11, the display 12, and the back cover 21 is an XY plane. It may be understood that a coordinate system of the electronic device 100 can be flexibly set based on actual needs. This is not specifically limited herein.

The NFC antenna 30 is provided in an internal accommodating cavity of the electronic device 100. In some embodiments, referring to FIG. 2, the electronic device 100 further includes a middle plate 23. The middle plate 23 is fastened to a circumference of an inner surface of the frame 22. For example, the middle plate 23 may be fastened to the frame 22 through welding. The middle plate 23 and the frame 22 may alternatively be an integral structure. The middle plate 23 is used as a "skeleton" of a structure of the electronic device 100. The NFC antenna 30 may be supported and fastened to the middle plate 23. For example, the NFC antenna 30 is supported and fastened to a surface that is of the middle plate 23 and that is close to the back cover 21. For another example, the NFC antenna 30 is supported and fastened to a surface that is of the middle plate 23 and that is close to the screen 10. In another embodiment, when the electronic device 100 does not include the middle plate 23, the NFC antenna 30 may be supported and fastened to a surface that is of the screen 10 and that is close to the back cover 21.

The NFC antenna 30 is configured to transmit or receive radio frequency signals. In some embodiments, the NFC antenna 30 may be used to transmit a radio frequency signal to a side close to the back cover 21, or to receive a radio frequency signal on a side close to the back cover 21, so that the electronic device 100 is enabled to establish a communication connection with another electronic device (such as a POS) located on a back side of the electronic device 100. In another embodiment, the NFC antenna 30 may alternatively be used to transmit a radio frequency signal to a side close to the screen 10, or to receive a radio frequency signal on a side close to the screen 10, so that the electronic device 100 is enabled to establish a communication connection with another electronic device located on a front side of the electronic device 100.

Figure 3:
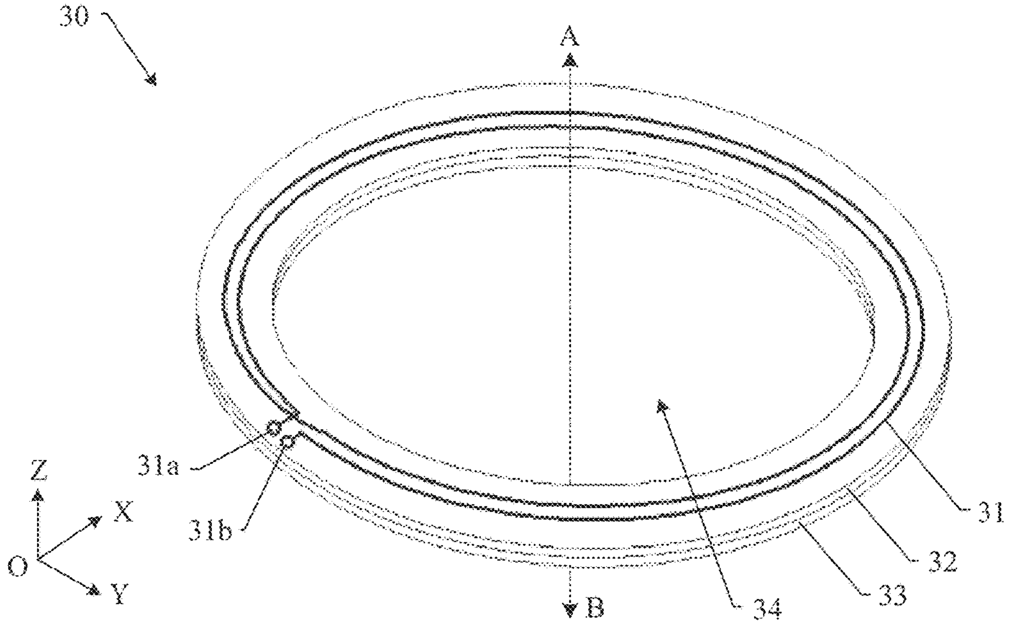
FIG. 3 is a schematic diagram of a structure of an NFC antenna in the electronic device shown in FIG. 2.

FIG. 3 is a schematic diagram of a structure of an NFC antenna 30 in the electronic device 100 shown in FIG. 2. In this embodiment, the NFC antenna 30 includes an NFC coil 31, a first terminal 31*a*, a second terminal 31*b*, a circuit board 32, and a magnetic shielding sheet 33.

It may be understood that FIG. 3 only shows an example of some components included in the NFC antenna 30, and actual shapes, sizes, locations and constructions of these components are not limited by FIG. 3. In some other examples, the electronic device 100 may not include the circuit board 32 and the magnetic shielding sheet 33.

The NFC coil 31 is a signal transmitting and receiving body of the NFC antenna 30. The NFC coil 31 is an annular structure formed by winding a conductive wire (such as a copper wire) along an annular track in the XY plane.

The conductive wire may be a conductive cable coated with an insulating material, or may be a metal layer provided on a circuit board. This is not specifically limited herein. FIG. 3 shows only an example in which the conductive wire is a metal layer provided on the circuit board 32. Specifically, the circuit board 32 may be a rigid circuit board, may be a flexible circuit board, or may be a flexible-rigid circuit board. The circuit board 32 may be an FR-4 dielectric plate, a Rogers dielectric plate, an FR-4 and Rogers mixed dielectric plate, or the like. FR-4 herein is a mark of a flame-resistant material level, and the Rogers dielectric plate is a high-frequency board. This ensures manufacturing accuracy of the NFC coil 31. A shape of the circuit board 32 includes, but is not limited to, a rectangle, a square, a triangle, a circle, an ellipse, or a polygon.

The NFC coil 31 may be in a square-ring structure, a circular-ring structure, a triangular-ring structure, a polygonal-ring structure, or the like. This is not specifically limited herein. FIG. 3 shows only an example in which the NFC coil 31 is of a circular-ring structure, but this shall not be considered as a specific limitation on this application.

Further, the NFC coil 31 includes a plurality of turns of conductive wires. Specifically, the NFC coil 31 may include two turns, three turns, four turns, five turns, or more turns of conductive wires. This is not specifically limited herein.

The first terminal 31*a* and the second terminal 31*b* are connected to two opposite ends of the NFC coil 31. The first terminal 31*a* and the second terminal 31*b* are configured to transmit a radio frequency signal to the NFC coil 31.

The NFC coil 31 includes a first side A and a second side B that are opposite to each other. The first side A and the second side B respectively are two opposite sides of a plane in which the NFC coil 31 is located. The NFC antenna 30 is configured to radiate a radio frequency signal to the first side A, or to receive a radio frequency signal on the first side A. That is, the first side A of the NFC coil 31 is a signal transceiver side of the NFC antenna 30.

Figure 4:
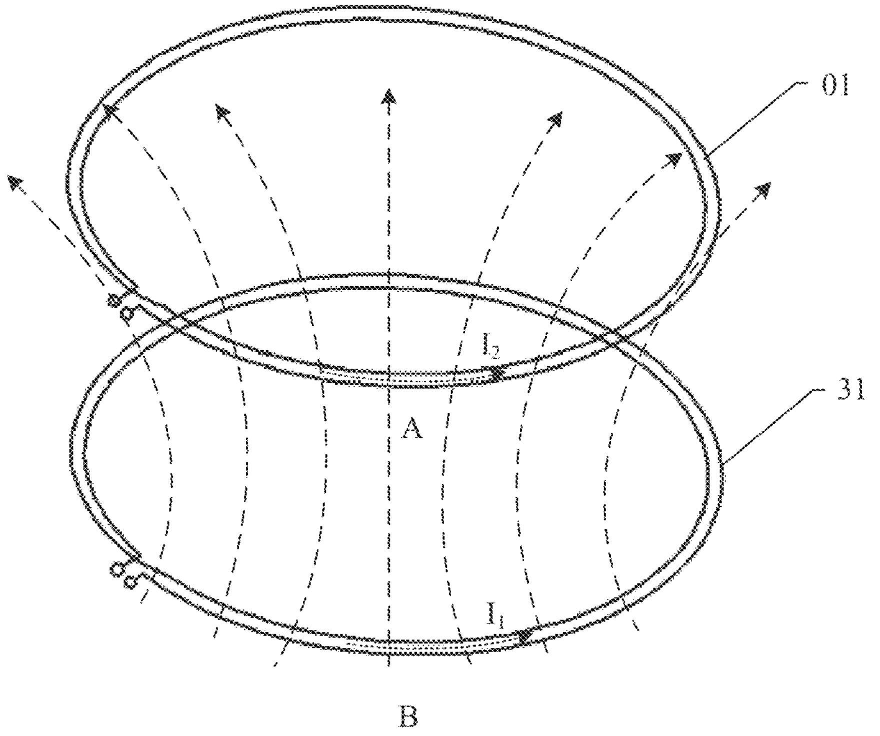
FIG. 4 is a diagram of an electromagnetic field distribution when an NFC coil communicates with an NFC coil of another electronic device.

FIG. 4 is a diagram of an electromagnetic field distribution when an NFC coil communicates with an NFC coil of another electronic device. When a modulated high-frequency alternate current signal $I_1$ (that is, a radio frequency signal) is transmitted to the NFC coil 31 through the first terminal 31*a* and the second terminal 31*b*, the first side A of the NFC coil 31 can be energized to generate a changed magnetic field. When another electronic device moves close to the electronic device 100 from the first side A of the NFC coil 31, the changed magnetic field passes through an NFC coil 01 of the another electronic device, thereby generating an inductive current $I_2$carrying a signal in the NFC coil 01. In this way, transmission of a radio frequency signal between the electronic device 100 and the another electronic device is implemented through magnetic field coupling.

In some embodiments, the back cover 21 in FIG. 2 is opposite to the plane in which the NFC coil 31 is located, and the back cover 21 is located on the first side A of the NFC coil 31. In this way, the NFC antenna 30 may transmit a radio frequency signal to a side close to the back cover 21, or to receive a radio frequency signal on a side close to the back cover 21, so that the electronic device 100 is enabled to establish a communication connection with another electronic device located on a back side of the electronic device 100. In some other embodiments, the screen 10 in FIG. 2 is opposite to the plane in which the NFC coil 31 is located, and the screen 10 is located on the first side A of the NFC coil 31. In this way, the NFC antenna 30 may transmit a radio frequency signal to a side close to the screen 10, or to receive a radio frequency signal on a side close to the screen 10, so that the electronic device 100 is enabled to establish a communication connection with another electronic device located on a front side of the electronic device 100.

The magnetic shielding sheet 33 is provided on the second side B of the NFC coil 31. The magnetic shielding sheet 33 is stacked with the plane in which the NFC coil 31 is located. In some embodiments, an orthographic projection that is of the NFC coil 31 and that is on the magnetic shielding sheet 33 is located within the magnetic shielding sheet 33. The magnetic shielding sheet 33 is configured to reduce magnetic field absorption of a metal structure (such as the middle plate 23 in FIG. 2) of a side that is of the magnetic shielding sheet 33 and that is away from the NFC coil 31 to the NFC coil 31. In addition, the magnetic shielding sheet 33 can increase magnetic field strength of the first side A, so that the NFC antenna 30 has signal transmitting/receiving directionality, thereby increasing an electromagnetic induction distance. The magnetic shielding sheet 33 may include a magnetic material. For example, the magnetic shielding sheet 33 may be ferrite. In another embodiment, the magnetic shielding sheet 33 may include at least one of magnetic materials such as Nd—Fe—B, samarium, Al—Ni—Co; Fe—Si—Al, Ni—Fe, and the like. A shape of the magnetic shielding sheet 33 includes, but is not limited to, a rectangle, a square, a triangle, a circle, an ellipse, or a polygon.

In some embodiments, referring to FIG. 3, the magnetic shielding sheet 33 is stacked with the circuit board 32. In some embodiments, the magnetic shielding sheet 33 and a part that is of the circuit board 32 and that is opposite to a hollow area of the NFC coil 31 are provided with an avoidance through-hole 34. The avoidance through-hole 34 may avoid another electronic device within the electronic device 100, (such as a camera module 00), so that the NFC coil 31 is provided around one circumference of the another electronic device (such as the camera module 00), thereby reducing space occupied by the NFC antenna 30 within the electronic device 100.

Referring back to FIG. 2, the mainboard 40 is fastened in the internal accommodating cavity of the electronic device 100. For example, the mainboard 40 may be fastened to the middle plate 23 by using a threaded connection, a clamping connection, or the like. When the electronic device 100 does not include the middle plate 23, the mainboard 40 may alternatively be fastened, by using a threaded connection, a clamping connection, or the like, to a surface that is of the display 12 and that is close to the back cover 21.

The electronic device 100 may further include a processor, an NFC controller, a matching circuit, and the like. The processor, the NFC controller, and the matching circuit are electrically connected in sequence. The matching circuit is electrically connected to the first terminal 31*a* and the second terminal 31*b* of the NFC coil 31. In this way, circuit connection of the NFC antenna 30 is implemented. In some embodiments, the processor, the NFC controller, and the matching circuit may be provided on the mainboard 40. In some other embodiments, the processor, the NFC controller, and the matching circuit may alternatively be provided on another circuit board within the electronic device, such as a circuit board on which a universal serial bus (USB) device is located. In some embodiments, the processor is an application processor (AP).

Still referring to FIG. 2, the metal member 50 is provided on the first side A of the NFC coil 31. That is, the metal member 50 is located on the signal transceiver side of the NFC antenna 30. In some embodiments, referring to FIG. 2, the first side A of the NFC coil 31 is a side that is of the NFC coil 31 and that is close to the back cover 21. The metal member 50 is a camera decoration cover provided on the back cover 21. Specifically, the back cover 21 is provided with a mounting opening 60. The camera decoration cover covers and is fastened to the mounting opening 60. The camera decoration cover is configured to protect a rear camera module of the electronic device 100. In another embodiment, the metal member 50 may be another structure provided on the back cover 21, such as a logo provided on the back cover 21, a finger ring adhered to an outer surface of the back cover 21, a decorative member fastened to a mobile phone case coated on the outer surface of the back cover 21, and the like. This is not specifically limited herein. The metal member 50 may be a sheet, a block, a plate, or the like. This not specifically limited herein. A material of the metal member 50 includes, but is not limited to, at least one of copper, iron, aluminum, copper alloy, iron alloy, and aluminum alloy.

Since the metal member 50 is located on the signal transmitting/receiving side of the NFC antenna 30, the metal member 50 (especially a large-area metal member) easily blocks a magnetic field generated by the NFC antenna 30 from being inside the electronic device 100 and blocks a magnetic field of another device from being outside the electronic device 100. Consequently, transmitting/receiving of the radio frequency signal is prevented.

Figure 5:
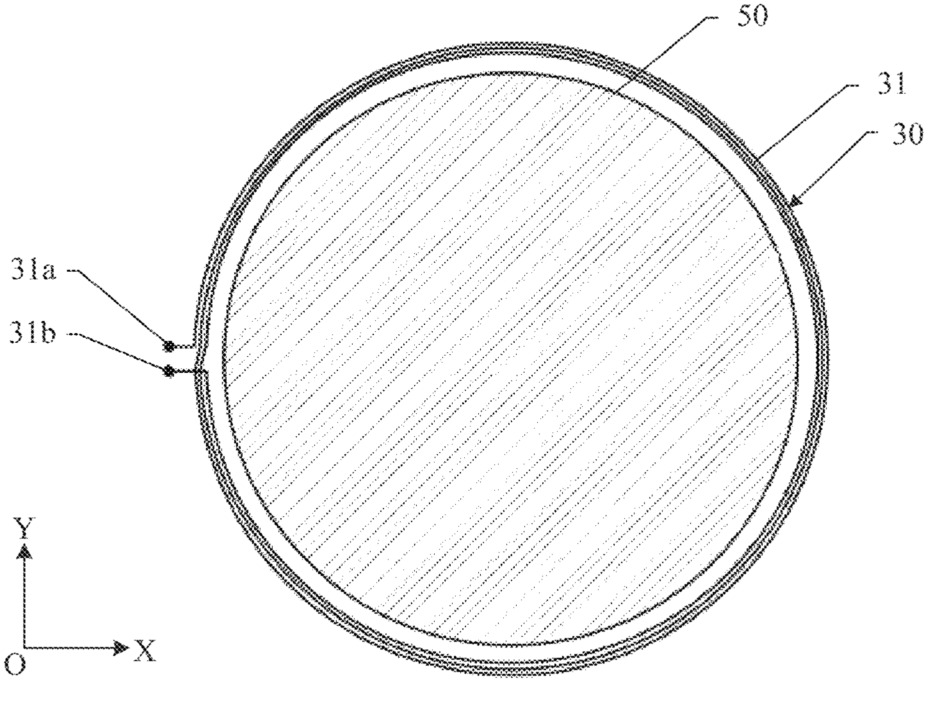
FIG. 5 is a diagram of a relative position of an NFC coil and a metal member in the electronic device shown in FIG. 2.

To avoid the foregoing problems, refer to FIG. 5. FIG. 5 is a diagram of a relative position of an NFC coil 31 and a metal member 50 in the electronic device 100 shown in FIG. 2. A shape of an orthographic projection of the metal member 50 in the plane in which the NFC coil 31 is located (that is, the XY plane) includes, but is not limited to, a circle, a rectangle, a polygon, and a triangle. FIG. 5 shows only an example in which the shape of the orthographic projection of the metal member 50 in the plane in which the NFC coil 31 is located is circle, and this shall not be considered as a specific limitation on this application. The NFC coil 31 is located outside the orthographic projection of the metal member 50 in the plane in which the NFC coil 31 is located, so that the metal member 50 can be prevented from blocking a signal transmitting/receiving path of the NFC coil 31, to ensure signal transmitting/receiving performance of the NFC antenna 30. In addition, the NFC coil 31 is provided around and close to the orthographic projection of the metal member 50 on the plane in which the NFC coil 31 is located, so that a circumference of the NFC coil 31 is reduced and the space occupied by the NFC coil 31 within the electronic device 100 is reduced while preventing the metal member 50 from blocking the signal transmitting/receiving path of the NFC coil 31.

However, in the forgoing embodiment, when the NFC antenna 30 operates and a current is supplied to the NFC coil 31, a reverse current is induced on the metal member 50 surrounded by the NFC coil 31. According to the Ampere rule, a magnetic field generated by the reverse current is opposite to a magnetic field generated by the current in the NFC coil 31. This causes a card reading dead zone in space corresponding to a part of the area in the NFC coil 31.

Figure 6:
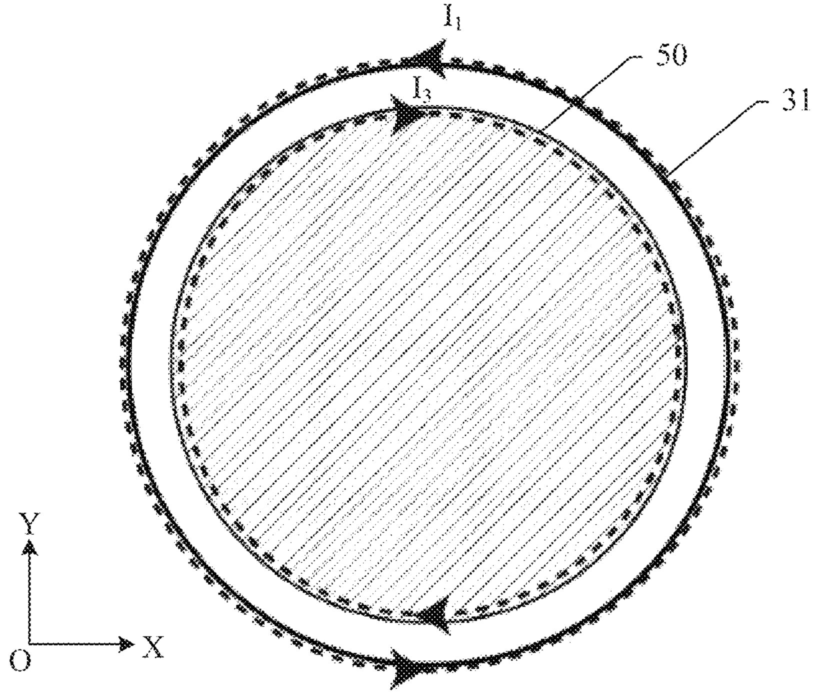
FIG. 6 is a diagram of a current distribution of the NFC coil and the metal member shown in FIG. 5 at a specific moment.
Figure 7:
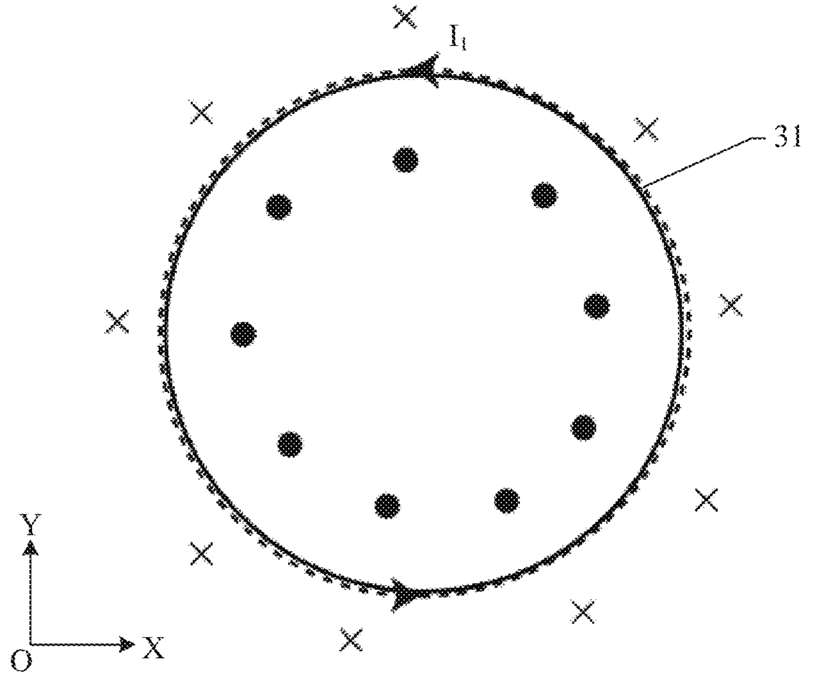
FIG. 7 is a diagram of a magnetic field distribution of the NFC coil in FIG. 6.
Figure 8:
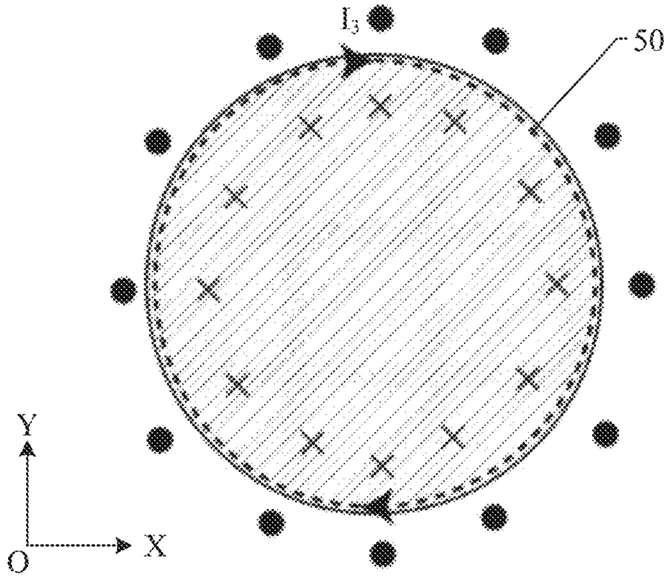
FIG. 8 is a diagram of a magnetic field distribution of the metal member in FIG. 6.
Figure 9:
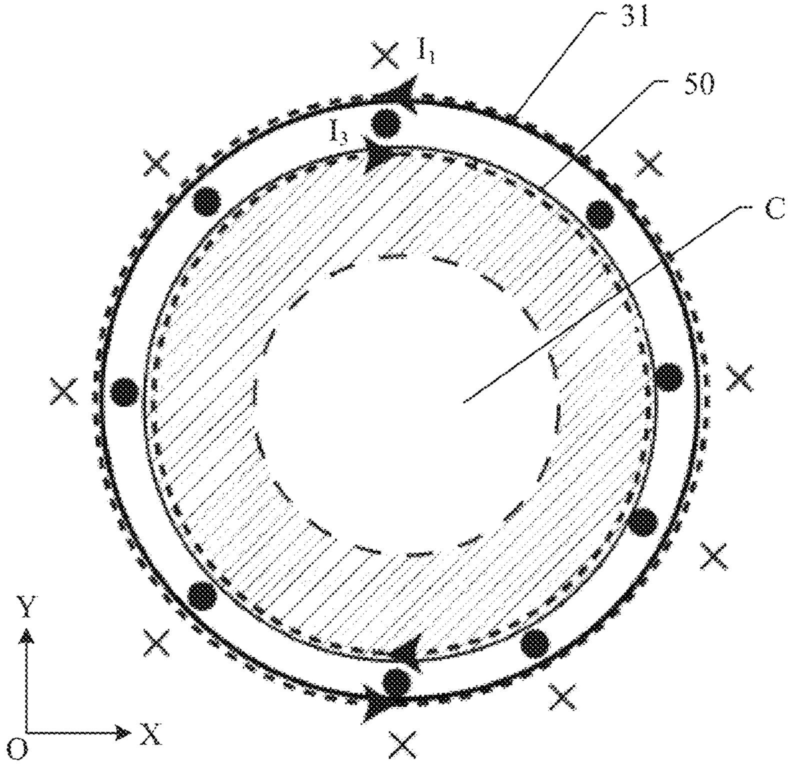
FIG. 9 is a diagram of a magnetic field distribution combined with the magnetic field distribution of the NFC coil shown in FIG. 7 and the magnetic field distribution of the metal member shown in FIG. 8.

For example, refer to FIG. 6. FIG. 6 is a diagram of a current distribution of the NFC coil 31 and the metal member 50 shown in FIG. 5 at a specific moment. A current supplied in the NFC coil 31 is $I_1$, and a current induced at an edge of the metal member 50 is 1.3. A direction of $I_1$ and a direction of $I_3$ are opposite. FIG. 7 is a diagram of a magnetic field distribution of the NFC coil 31 in FIG. 6; FIG. 8 is a diagram of a magnetic field distribution of the metal member 50 in FIG. 6; and FIG. 9 is a diagram of a magnetic field distribution combined with the magnetic field distribution of the NFC coil 31 shown in FIG. 7 and the magnetic field distribution of the metal member 50 shown in FIG. 8. In FIG. 7 to FIG. 9 and the following magnetic field diagram, "x" indicates a direction that is of a magnetic line and that is perpendicular to the plane and penetrates into the plane. "●" indicates a direction that is of the magnetic line and that is perpendicular to the plane and penetrates out of the plane. The magnetic field distribution can be obtained according to the Ampere rule. It may be learned from FIG. 7 to FIG. 9, after the magnetic field of the NFC coil 31 and the magnetic field of the metal member 50 cancel out, a large-area dead zone C is generated in a middle portion of the NFC coil 31, and the dead zone C means that a magnetic field of this region is very weak.

When a matched electronic device moves close to the electronic device 100, and an NFC coil of the matched electronic device (especially a small-volume coil) is opposite to the dead zone C, only a small amount of magnetic lines or even no magnetic line pass through the NFC coil of the matched electronic device. Consequently, radio frequency signal communication cannot be implemented, and performance of the NFC antenna 30 is degraded.

Figure 10:
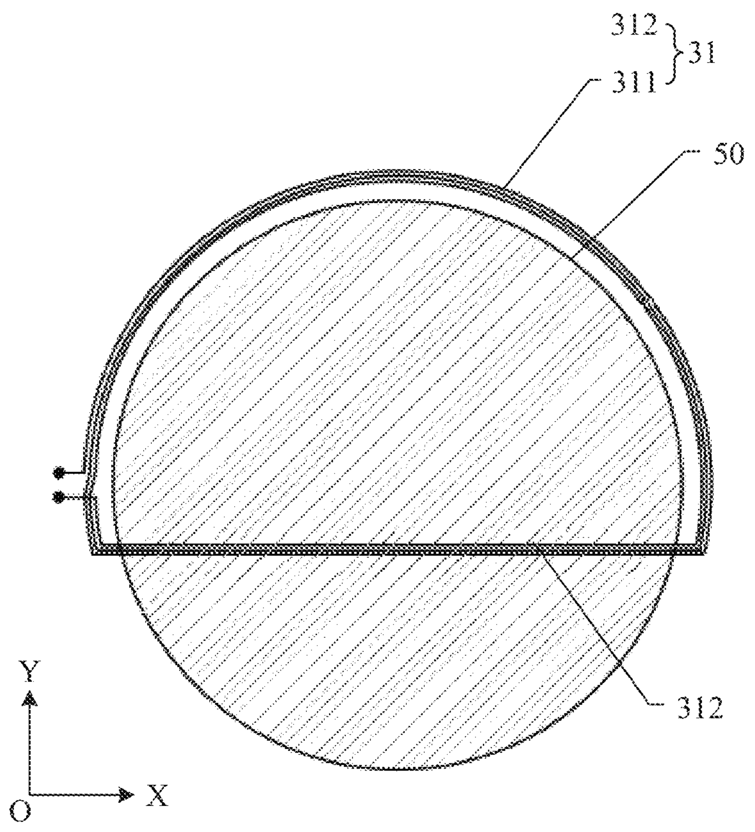
FIG. 10 is a diagram of a relative position of an NFC coil and a metal member according to some other embodiments of this application.

To improve the performance of the NFC antenna 30, refer to FIG. 10. FIG. 10 is a diagram of a relative position of an NFC coil 31 and a metal member 50 according to some other embodiments of this application. In this embodiment, the NFC coil 31 includes a first part 311 and a second part 312 arranged along a circumferential direction of the NFC coil 31. The first part 311 includes a plurality of conductive wire parts that is of the plurality of turns of conductive wires of the NFC coil 31 that are at a position of a first circumferential section. The first circumferential section is a specific section along the circumferential direction of the NFC coil 31, and each of the plurality of turns of conductive wires of the NFC coil 31 has a part located in the first circumferential section. The second part 312 includes a plurality of conductive wire parts that is of the plurality of turns of conductive wires of the NFC coil 31 that are at a position of a second circumferential section. The second circumferential section is a specific section along the circumferential direction of the NFC coil 31, and the second circumferential section and the first circumferential section are respectively located at different positions, and each of the plurality of turns of the conductive wires of the NFC coil 31 has a part located in the second circumferential section.

The first part 311 may extend along a straight line, an arc line, a fold line, and the like. This is not specifically limited herein. The second part 312 may extend along a straight line, an arc line, a fold line, and the like. This is not specifically limited herein. The first part 311 is located outside the orthographic projection that is of the metal member 50 and that is on the plane in which the NFC coil 31 is located, and is provided around the orthographic projection that is of the metal member 50 and that is on the plane in which the NFC coil 31 is located. The second part 312 passes through the orthographic projection that is of the metal member 50 and that is on the plane in which the NFC coil 31 is located.

Figure 11:
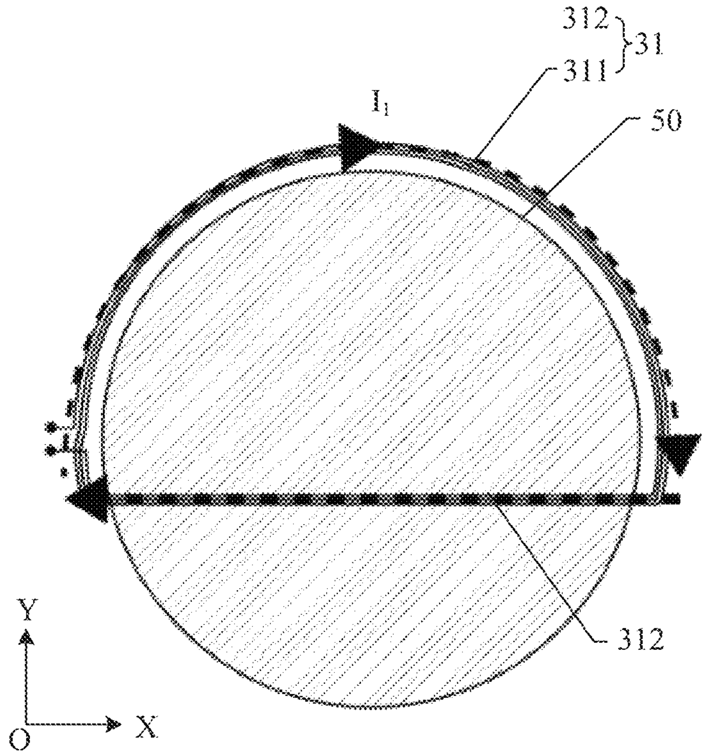
FIG. 11 shows a current distribution of the NFC coil when the NFC coil and the metal member shown in FIG. 10 is at a specific moment.
Figure 12:
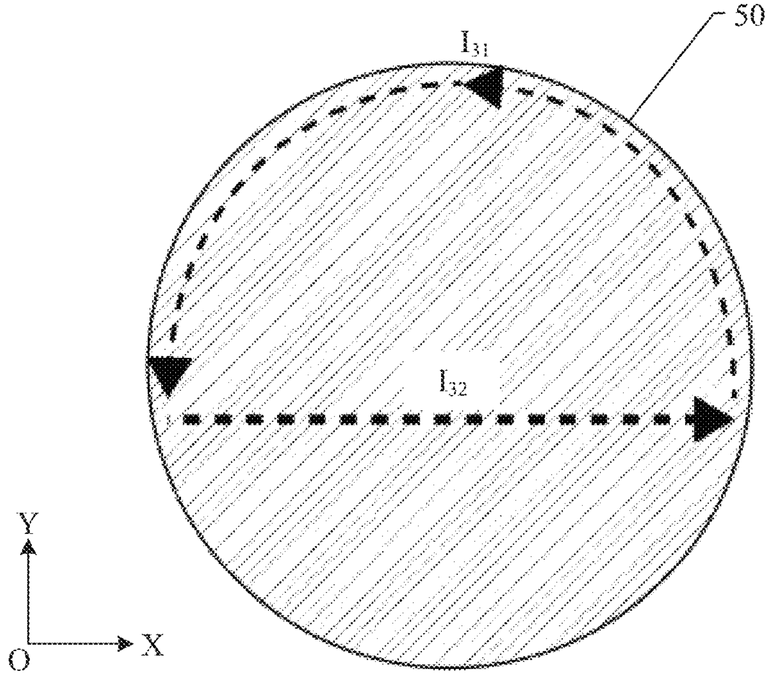
FIG. 12 is a diagram of a current distribution of the metal member in FIG. 11.
Figure 13:
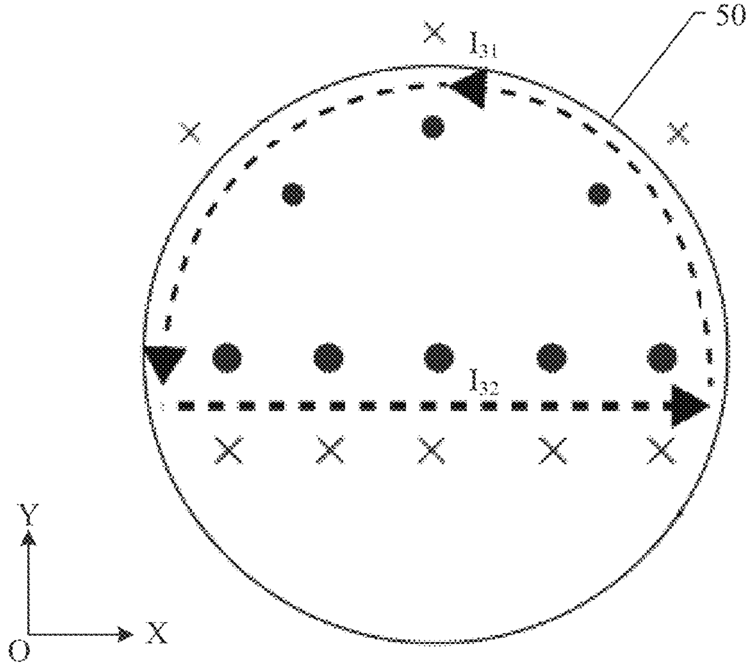
FIG. 13 is a diagram of a magnetic field distribution of the metal member shown in FIG. 12.
Figure 14:
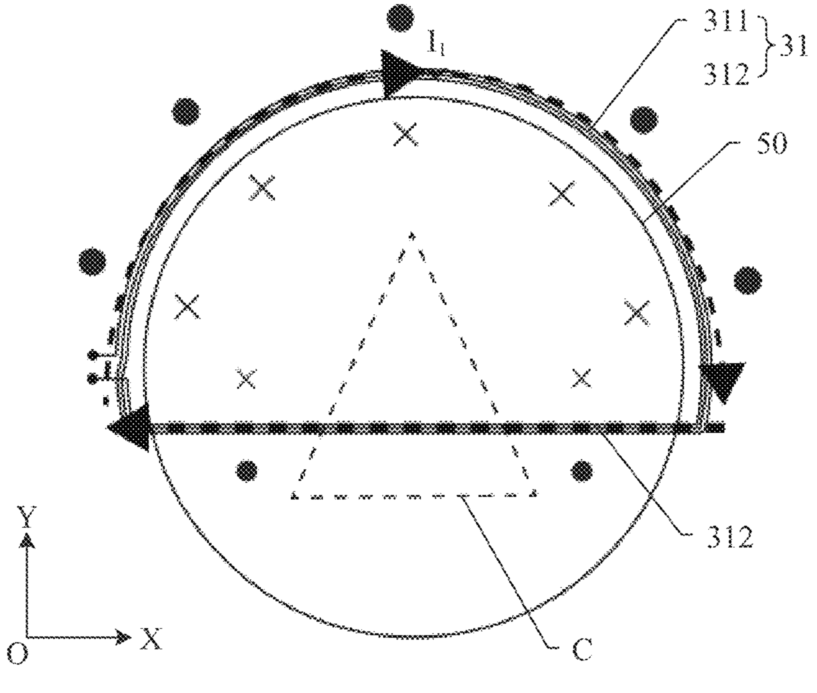
FIG. 14 is a diagram of a magnetic field distribution combined with a magnetic field distribution of the NFC coil in FIG. 11 and the magnetic field distribution of the metal member shown in FIG. 13.

FIG. 11 shows a current distribution of the NFC coil 31 when the NFC coil 31 and the metal member 50 shown in FIG. 10 is at a specific moment; and FIG. 12 is a diagram of a current distribution of the metal member 50 in FIG. 11. The current supplied in the NFC coil 31 is $I_1$, a current induced at a part that is of the metal member 50 and that is close to the first part 311 is $I_{31}$, and a current induced at a part that is of the metal member 50 and that is close to the second part 312 is $I_{32}$. The direction of $I_1$ and a direction of $I_{31}$ are opposite, and a direction of $I_1$ and a direction of $I_{32}$ are also opposite. With the thinning design of the electronic device, a distance between the second part 312 and the metal member 50 in the Z axis direction is generally smaller than a distance between the first part 311 and an edge of the metal member 50. Therefore, $I_{32}$ is greater than $I_{31}$. FIG. 13 is a diagram of a magnetic field distribution of the metal member 50 shown in FIG. 12. It may be learned from FIG. 13, since $I_{32}$ is greater than $I_{31}$, magnetic field strength generated by $I_{32}$ is greater than magnetic field strength generated by $I_{31}$, a reverse magnetic field close to $_{32}$ is large enough to be close to the magnetic field generated by the NFC coil. Therefore, in a magnetic field distribution after the magnetic field generated by the NFC coil is canceled out, magnetic field dead zone close to the second part 312 is large. FIG. 14 is a diagram of a magnetic field distribution combined with a magnetic field distribution of the NFC coil 31 in FIG. 11 and the magnetic field distribution of the metal member 50 shown in FIG. 14. It may be learned from FIG. 14, after the magnetic field of the NFC coil 31 and the magnetic field of the metal member 50 cancel out, the dead zone C is formed, and the dead zone C in FIG. 14 is generally of triangular. This represents only a schematic diagram. Generally, the dead zone at a lower part close to the second part 312 is relatively large, the dead zone at an upper part is relatively small. The dead zone C is transferred to an edge in which the second part 312 is located. In this way, distribution uniformity of magnetic lines in an area enclosed by the NFC coil 31 can be improved, and the performance of the NFC antenna 30 can be improved.

Figure 15A:
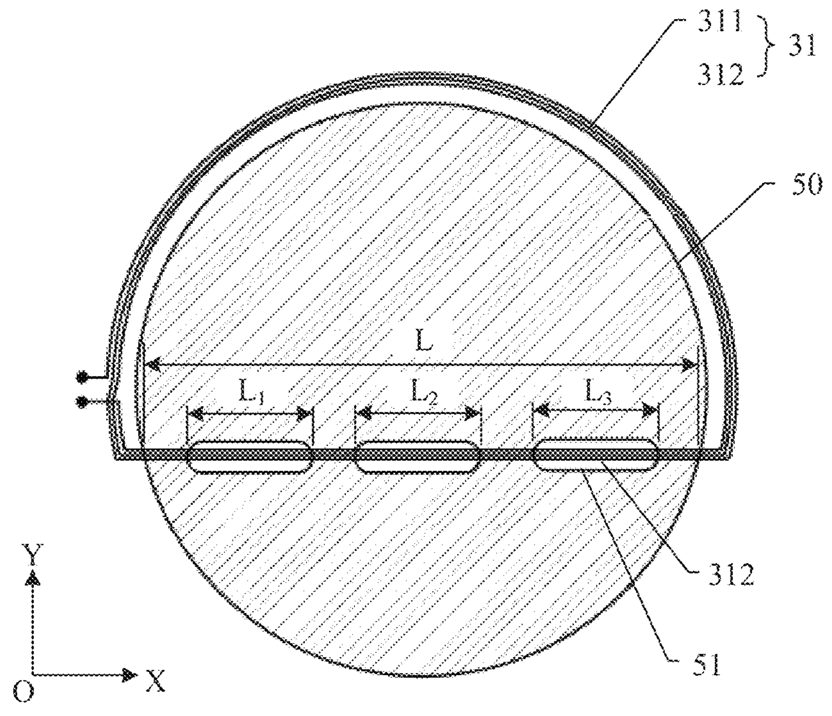
FIG. 15*a* is a diagram of a relative position of an NFC coil and a metal member according to some other embodiments of this application.

To further improve the uniformity of the distribution of the magnetic lines in the region enclosed by the NFC coil 31 and improve the performance of the NFC antenna 30, refer to FIG. 15*a*. FIG. 15*a* is a diagram of a relative position of an NFC coil 31 and a metal member according to some other embodiments of this application; In this embodiment, the metal member 50 is provided with at least one through-hole 51. The "at least one" means one or more. The second part 312 overlaps an orthographic projection that is of the through-hole 51 and that is on the plane in which the NFC coil 31 is located, so that the second part 312 is exposed. That is, the through-hole 51 connects one side that is of the metal member 50 and that is close to the plane in which the NFC coil 31 is located and one side that is of the metal member 50 and that is from the plane in which the NFC coil 31 is located, and the through-hole 51 is opposite to the second part 312 of the NFC coil 31. In this way, the second part 312 of the NFC coil 31 can be exposed through the through-hole 51, so that a magnetic field generated by the second part 312 can be transmitted, through the through-hole 51, to a side that is of the metal member and that is away from the NFC coil 31. Correspondingly, the second part 312 may also receive, through the through-hole 51, a magnetic field on the side that is of the metal member and that is away from the NFC coil 31.

Figure 15B:
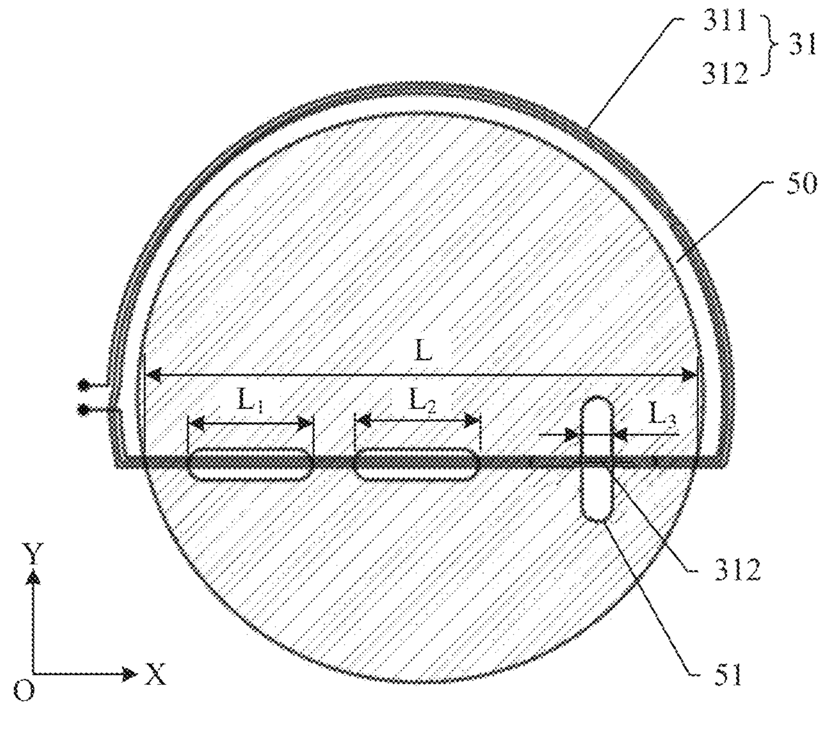
FIG. 15*b* is a diagram of a relative position of an NFC coil and a metal member according to some other embodiments of this application.

In the foregoing embodiment, a quantity of the through-holes 51 may be one, two, three, or more, and this is not specifically limited herein. FIG. 15*a* merely shows an example in which the quantity of through-holes 51 is three, but this shall not be considered as a special limitation on this application. A periphery of the through-hole 51 is closed. That is, a sum of lengths of through-holes 51 provided in the metal member 50 in an extension path parallel to the second part 312 is less than a length of the metal member 50 in the extension path parallel to the second part 312. For example, in an embodiment shown in FIG. 15*a*, lengths that are of three through-holes 51 provided in the metal member 50 and that are in the extension path parallel to the second part 312 are $L_1$, $L_2$, and $L_3$, the length that is of the metal member 50 and that is in the extension path parallel to the second part 312 is L, and $L_1+L_2+L_3<L$. The through-holes 51 may be circular holes, strip-shaped holes, square holes, polygonal holes, or the like. These are not specifically limited herein. When the through-holes 51 are strip-shaped holes, a length direction of the through-holes 51 may be parallel to an extension path of the second part 312, or may be perpendicular to or intersected with the extension path of the second part 312, and this is not specifically limited herein. FIG. 15*a* shows only an example in which the length direction of the through-holes 51 coincides with the extension path of the second part 312. In some other embodiments, refer to FIG. 15*b*. FIG. 15*b* is a diagram of a relative position of an NFC coil 31 and a metal member 50 according to some other embodiments of this application. A rightmost through-hole 51 is a strip-shaped hole, and a length direction of the through-hole 51 is perpendicular to the extension path of the second part 312, and the length $L_3$ of the through-hole 51 in the extension path parallel to the second part 312 is a width of the through-hole 51. In some embodiments, the sum of lengths of through-holes 51 provided in the metal member 50 in the extension path parallel to the second part 312 is less than five-thousandths of a wavelength of the NFC antenna 30.

According to descriptions of the foregoing embodiments, the following describes several embodiments associated with the NFC antenna 30, the NFC coil 31, and the metal member 50.

Figure 16:
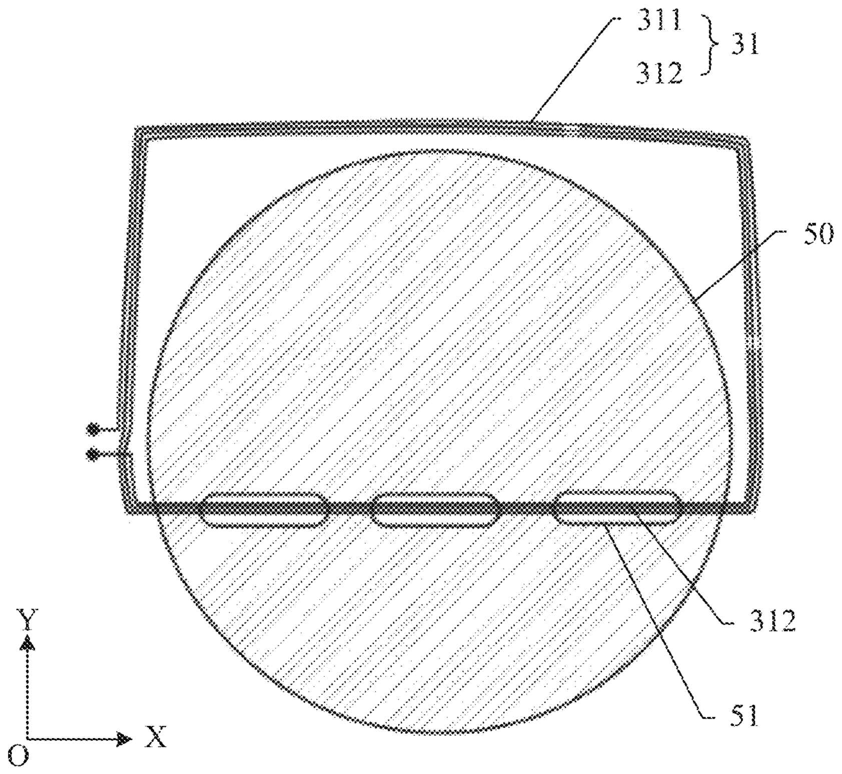
FIG. 16 is a diagram of a relative position of an NFC coil and a metal member according to some other embodiments of this application.

FIG. 16 is a diagram of a relative position of an NFC coil 31 and a metal member according to some other embodiments of this application. In this embodiment, the NFC coil 31 is in a square-ring structure. The shape of the orthographic projection that is of the metal member 50 and that is on the plane in which the NFC coil 31 is located is circular. The second part 312 of the NFC coil 31 extends along a straight line. The quantity of through-holes 51 is three. Each of the three through-holes 51 is a strip-shaped hole.

Figure 17:
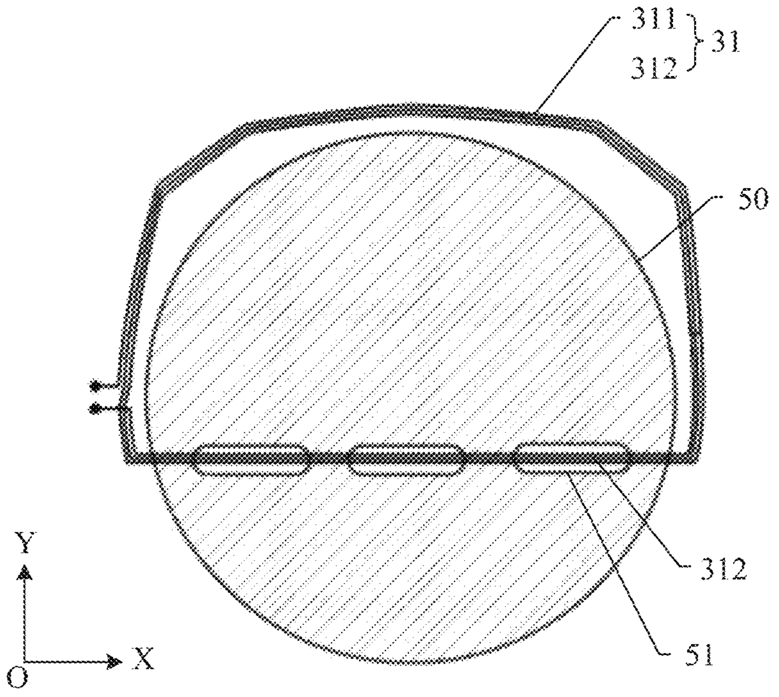
FIG. 17 is a diagram of a relative position of an NFC coil and a metal member according to some other embodiments of this application.

FIG. 17 is a diagram of a relative position of an NFC coil 31 and a metal member according to some other embodiments of this application. In this embodiment, the NFC coil 31 is approximately in a square-ring structure. The shape of the orthographic projection that is of the metal member 50 and that is on the plane in which the NFC coil 31 is located is circular. The second part 312 of the NFC coil 31 extends along a straight line. The quantity of through-holes 51 is three. Each of the three through-holes 51 is a strip-shaped hole.

Figure 18:
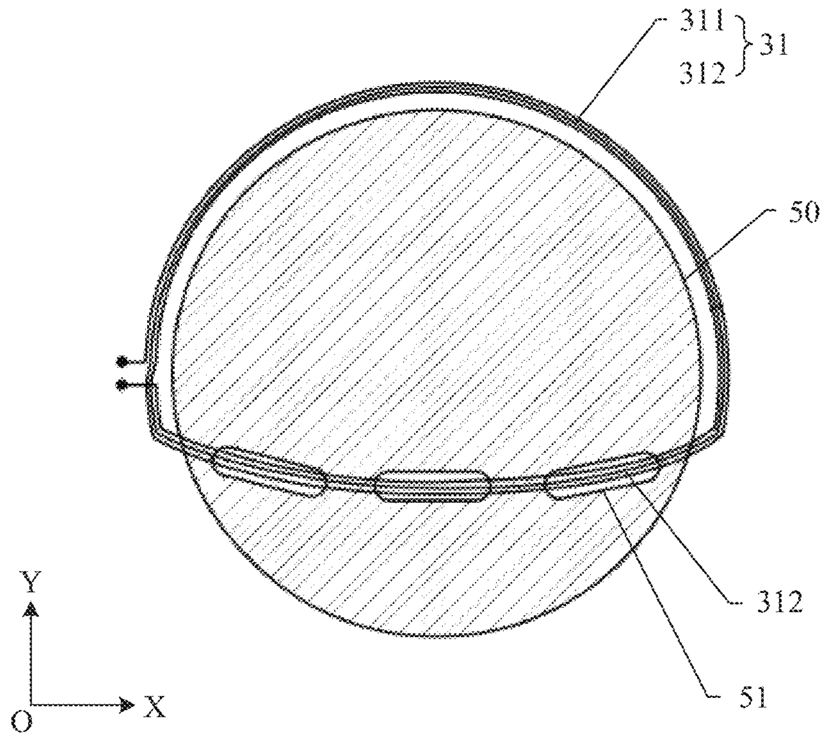
FIG. 18 is a diagram of a relative position of an NFC coil and a metal member according to some other embodiments of this application.

FIG. 18 is a diagram of a relative position of an NFC coil 31 and a metal member according to some other embodiments of this application. In this embodiment, the first part 311 of the NFC coil 31 extends along an arc. The second part 312 of the NFC coil 31 extends along a concave arc. The shape of the orthographic projection that is of the metal member 50 and that is on the plane in which the NFC coil 31 is located is circular. The quantity of through-holes 51 is three. Each of the three through-holes 51 is a strip-shaped hole, and a length direction of the strip-shaped hole coincides with an extension direction of the opposite second part 312.

Figure 19:
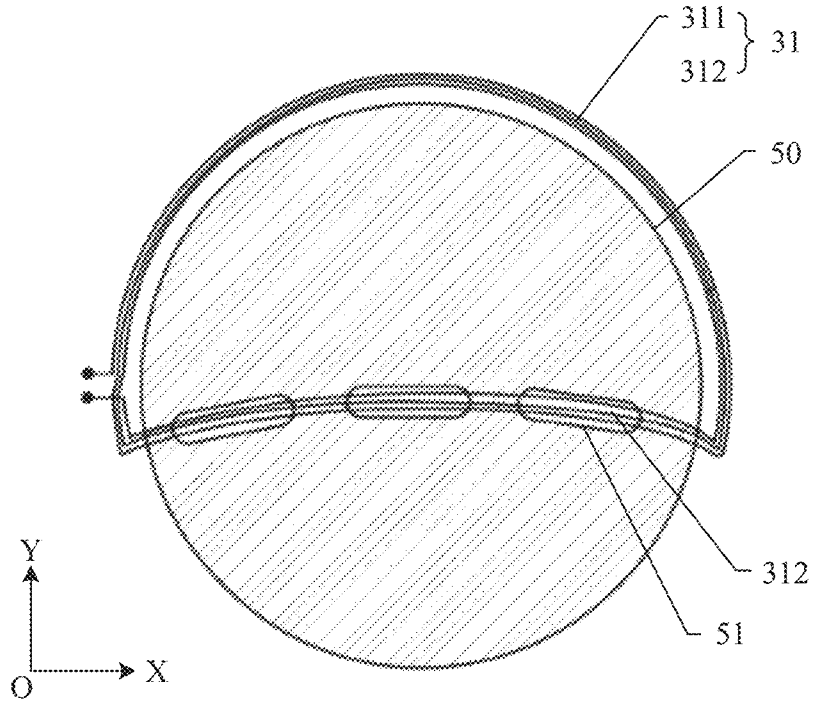
FIG. 19 is a diagram of a relative position of an NFC coil and a metal member according to some other embodiments of this application.

FIG. 19 is a diagram of a relative position of an NFC coil 31 and a metal member according to some other embodiments of this application. In this embodiment, the first part 311 of the NFC coil 31 extends along an arc. The second part 312 of the NFC coil 31 extends along a convex arc. The shape of the orthographic projection that is of the metal member 50 and that is on the plane in which the NFC coil 31 is located is circular. The quantity of through-holes 51 is three. Each of the three through-holes 51 is a strip-shaped hole, and a length direction of the strip-shaped hole coincides with an extension direction of the opposite second part 312.

Figure 20:
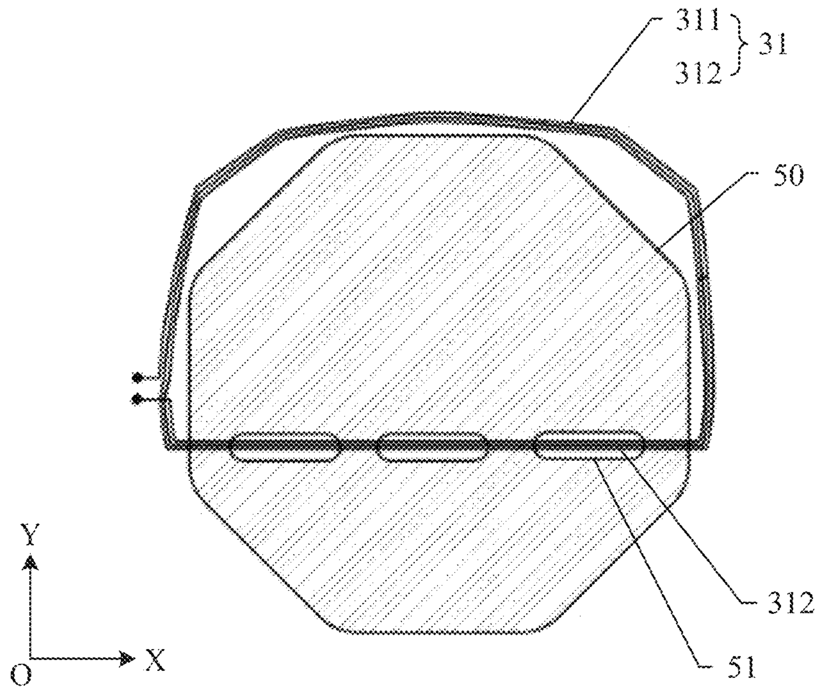
FIG. 20 is a diagram of a relative position of an NFC coil and a metal member according to some other embodiments of this application.

FIG. 20 is a diagram of a relative position of an NFC coil 31 and a metal member according to some other embodiments of this application. In this embodiment, the NFC coil 31 is approximately in a square-ring structure. The shape of the orthographic projection that is of the metal member 50 and that is on the plane in which the NFC coil 31 is located is octagonal. The second part 312 of the NFC coil 31 extends along a straight line. The quantity of through-holes 51 is three. Each of the three through-holes 51 is a strip-shaped hole.

Figure 21:
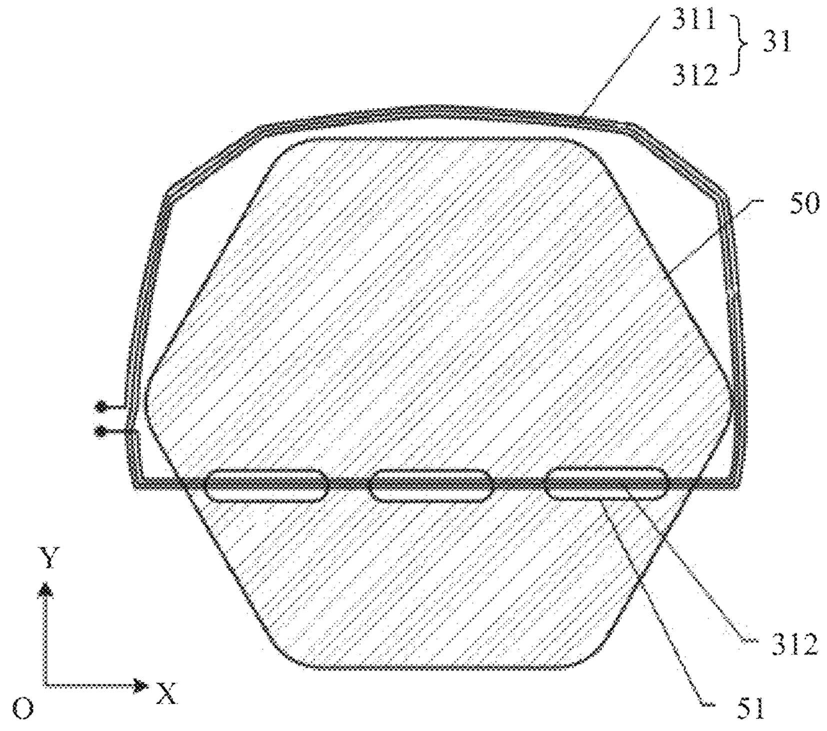
FIG. 21 is a diagram of a relative position of an NFC coil and a metal member according to some other embodiments of this application.

FIG. 21 is a diagram of a relative position of an NFC coil 31 and a metal member according to some other embodiments of this application. In this embodiment, the NFC coil 31 is approximately in a square-ring structure. The shape of the orthographic projection that is of the metal member 50 and that is on the plane in which the NFC coil 31 is located is hexagonal. The second part 312 of the NFC coil 31 extends along a straight line. The quantity of through-holes 51 is three. Each of the three through-holes 51 is a strip-shaped hole.

Figure 22:
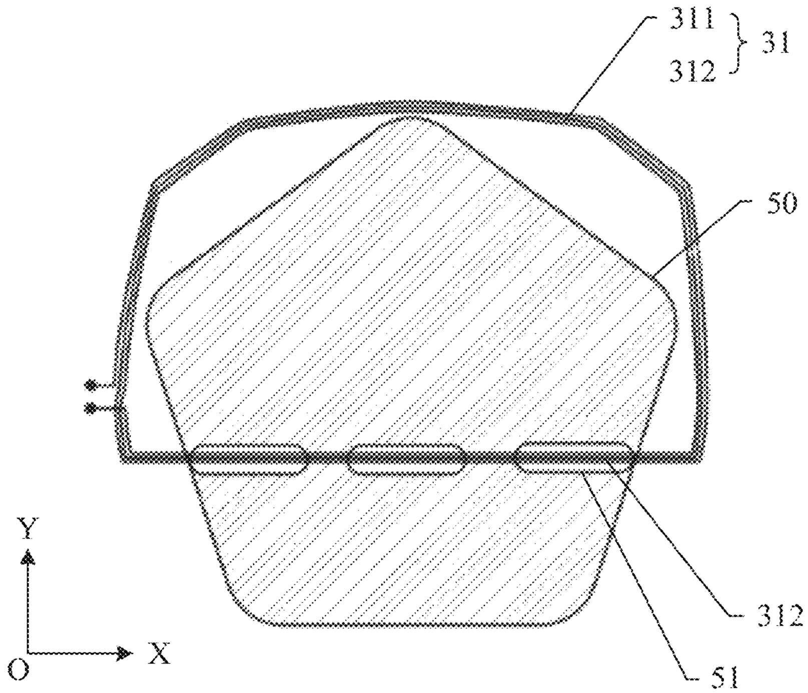
FIG. 22 is a diagram of a relative position of an NFC coil and a metal member according to some other embodiments of this application.

FIG. 22 is a diagram of a relative position of an NFC coil 31 and a metal member according to some other embodiments of this application. In this embodiment, the NFC coil 31 is approximately in a square-ring structure. The shape of the orthographic projection that is of the metal member 50 and that is on the plane in which the NFC coil 31 is located is pentagonal. The second part 312 of the NFC coil 31 extends along a straight line. The quantity of through-holes 51 is three. Each of the three through-holes 51 is a strip-shaped hole.

Figure 23:
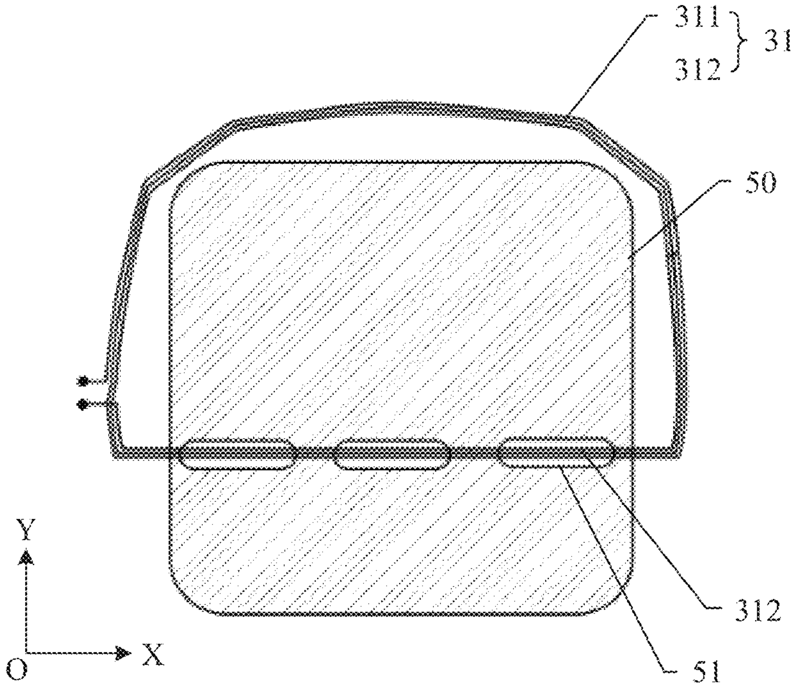
FIG. 23 is a diagram of a relative position of an NFC coil and a metal member according to some other embodiments of this application.

FIG. 23 is a diagram of a relative position of an NFC coil 31 and a metal member according to some other embodiments of this application. In this embodiment, the NFC coil 31 is approximately in a square-ring structure. The shape of the orthographic projection that is of the metal member 50 and that is on the plane in which the NFC coil 31 is located is square. The second part 312 of the NFC coil 31 extends along a straight line. The quantity of through-holes 51 is three. Each of the three through-holes 51 is a strip-shaped hole.

Figure 24:
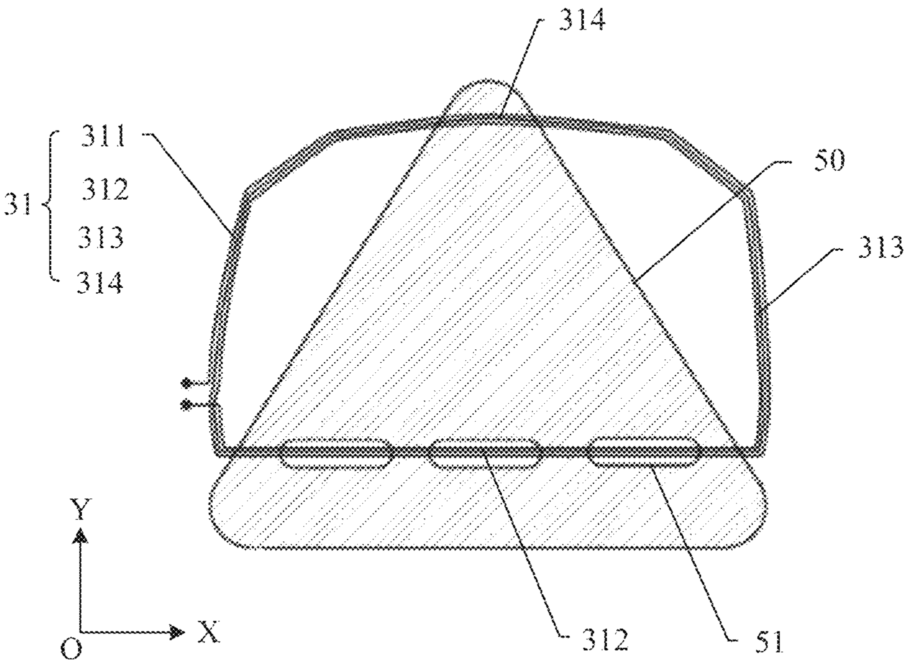
FIG. 24 is a diagram of a relative position of an NFC coil and a metal member according to some other embodiments of this application.

FIG. 24 is a diagram of a relative position of an NFC coil 31 and a metal member 50 according to some other embodiments of this application. In this embodiment, the NFC coil 31 is approximately in a square-ring structure. The shape of the orthographic projection that is of the metal member 50 and that is on the plane in which the NFC coil 31 is located is triangular. The second part 312 of the NFC coil 31 extends along a straight line. The quantity of through-holes 51 is three. Each of the three through-holes 51 is a strip-shaped hole.

In the foregoing embodiment, optionally, still referring to FIG. 24, the NFC coil 31 includes, in addition to the first part 311 and the second part 312, a third part 313 and a fourth part 314 arranged along the circumferential direction of the NFC coil 31. The third part 313 includes a plurality of conductive wire parts that is of the plurality of turns of conductive wires of the NFC coil 31 that are at a position of a third circumferential section. The third circumferential section is a specific section along the circumferential direction of the NFC coil 31. The third circumferential section, the second circumferential section, and the first circumferential section each are located at different positions. Each of the plurality of turns of conductive wires of the NFC coil 31 has a part located in the third circumferential section. The fourth part 314 includes a plurality of conductive wire parts that is of the plurality of turns of conductive wires of the NFC coil 31 that are at positions of a fourth circumferential section. The fourth circumferential section is a specific section along the circumferential direction of the NFC coil 31. The fourth circumferential section, the third circumferential section, the second circumferential section, and the first circumferential section each are located at different positions. Each of the plurality of turns of conductive wires of the NFC coil 31 has a part located in the fourth circumferential section.

Along the circumferential direction of the NFC coil 31, the third part 313 and the first part 311 are respectively connected to two opposite ends of the second part 312. The third part 313 is located outside the orthographic projection that is of the metal member 50 and that is on the plane (that is, the XY plane) in which the NFC coil 31 is located, and is provided around the orthographic projection that is of the metal member 50 and that is on the plane in which the NFC coil 31 is located. Along the circumferential direction of the NFC coil 31, the second part 312 and the fourth part 314 are respectively connected to two opposite ends of the third part 313. The fourth part 314 passes through the orthographic projection that is of the metal member 50 and that is on the plane in which the NFC coil 31 is located. It can be learned from the foregoing derivation, after the magnetic field of the NFC coil 31 and the magnetic field of the metal member 50 cancel out, the formed dead zone C is transferred to an edge at which the second part 312 and the fourth part 314 are located. In this way, distribution uniformity of magnetic lines in an area enclosed by the NFC coil 31 can be improved, and the performance of the NFC antenna 30 can be improved.

Figure 25:
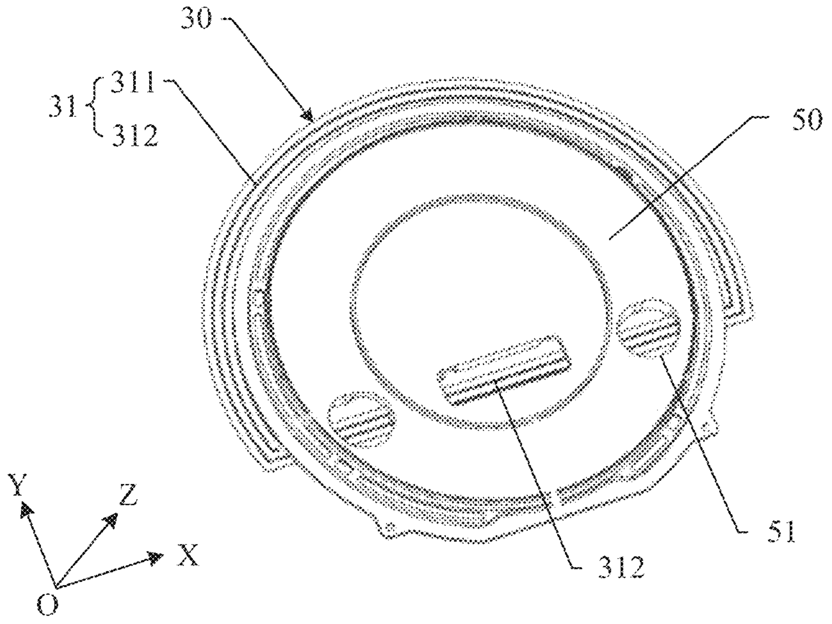
FIG. 25 is a diagram of a relative position of an NFC antenna and a metal member according to some embodiments of this application.

FIG. 25 is a diagram of a relative position of an NFC antenna 30 and a metal member 50 according to some embodiments of this application. In this embodiment, the first part 311 of the NFC coil 31 extends along an arc. The second part 312 of the NFC coil 31 extends along a straight line. The shape of the orthographic projection that is of the metal member 50 and that is on the plane in which the NFC coil 31 is located is circular. The quantity of through-holes 51 is three. Two circular holes and one rectangular hole are included. The rectangular hole is located in the middle and the two circular holes are distributed on two opposite sides of the rectangular hole.

Figure 26:
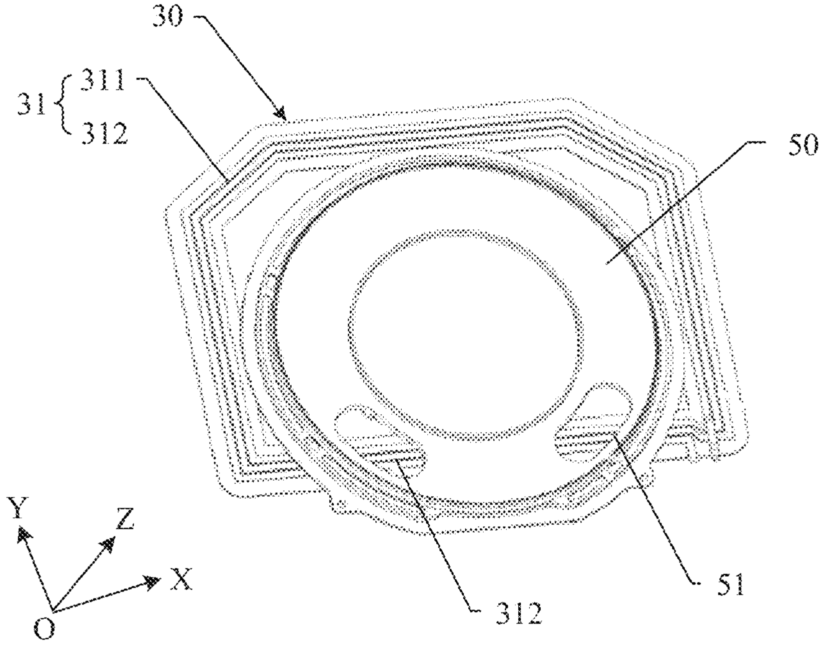
FIG. 26 is a diagram of a relative position of an NFC antenna and a metal member according to some other embodiments of this application.

FIG. 26 is a diagram of a relative position of an NFC antenna 30 and a metal member 50 according to some other embodiments of this application. In this embodiment, the NFC coil 31 is approximately in a square-ring structure. The shape of the orthographic projection that is of the metal member 50 and that is on the plane in which the NFC coil 31 is located is circular. The quantity of through-holes 51 is two. The two through-holes 51 each are a trip-shaped hole, and the strip-shaped hole extends along the circumferential direction of the metal member 50.

Figure 27:
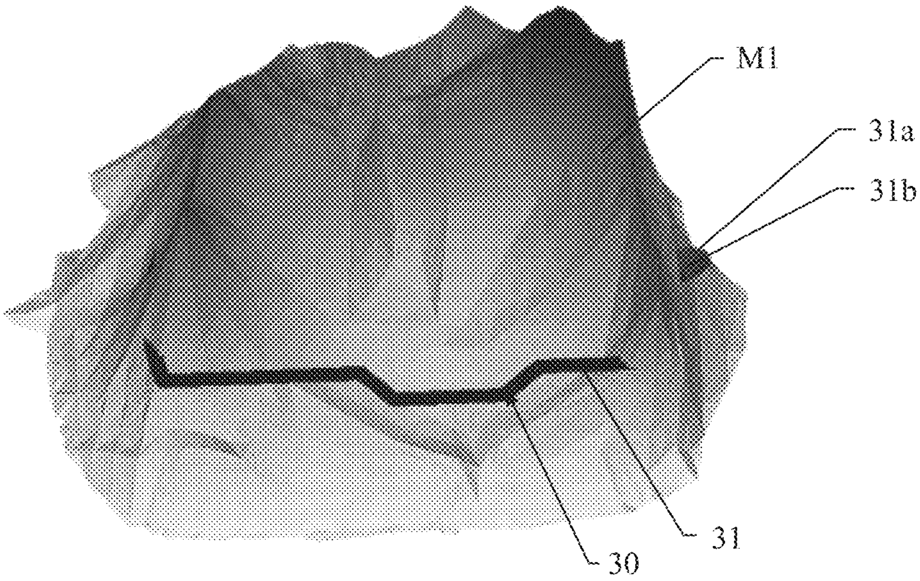
FIG. 27 is a diagram showing a simulation of magnetic field strength of an NFC antenna at 13.56 MHz when an NFC coil includes a first part and a second part, and a through-hole is provided in a metal member, according to an embodiment of this application.
Figure 28:
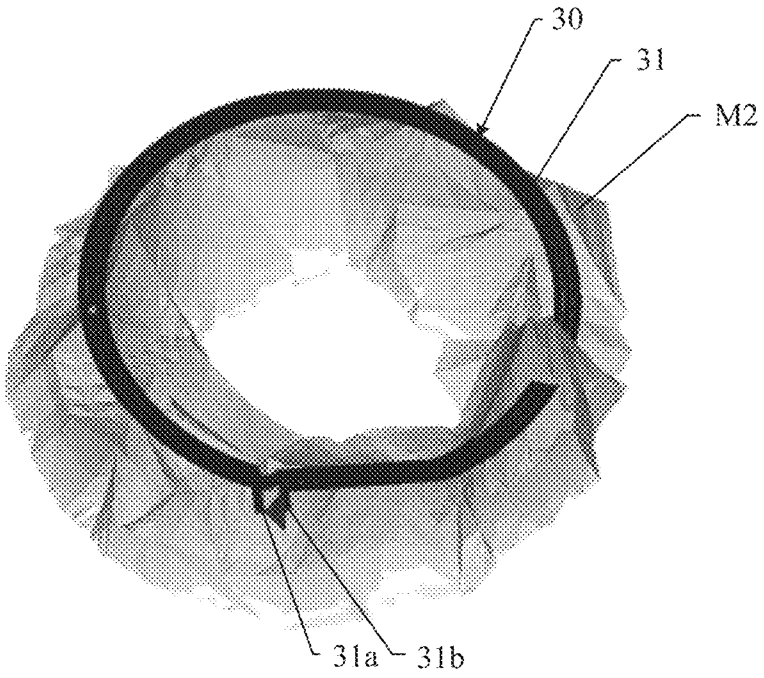
FIG. 28 is a diagram showing a simulation of magnetic field strength of the NFC antenna in FIG. 5 at 13.56 MHz.

FIG. 27 is diagram showing a simulation of magnetic field strength M1 of an NFC antenna 30 at 13.56 MHz when an NFC coil 31 includes a first part 311 and a second part 312, and a through-hole 51 is provided in a metal member 50, according to an embodiment of this application. FIG. 28 is a diagram showing a simulation of magnetic field strength M2 of the NFC antenna 30 in FIG. 5 at 13.56 MHz. It can be learned, by comparing FIG. 27 and FIG. 28, that there is an obvious magnetic field pit and zero point in the middle of the NFC antenna 30 shown in FIG. 28, and the magnetic field strength M1 inside the NFC antenna 30 shown in FIG. 27 is uniformly distributed without an obvious pit. Therefore, when the NFC coil 31 includes the first part 311 and the second part 312, and the metal member 50 is provided with the through-hole 51, performance of the NFC antenna 30 is better.

Figure 29:
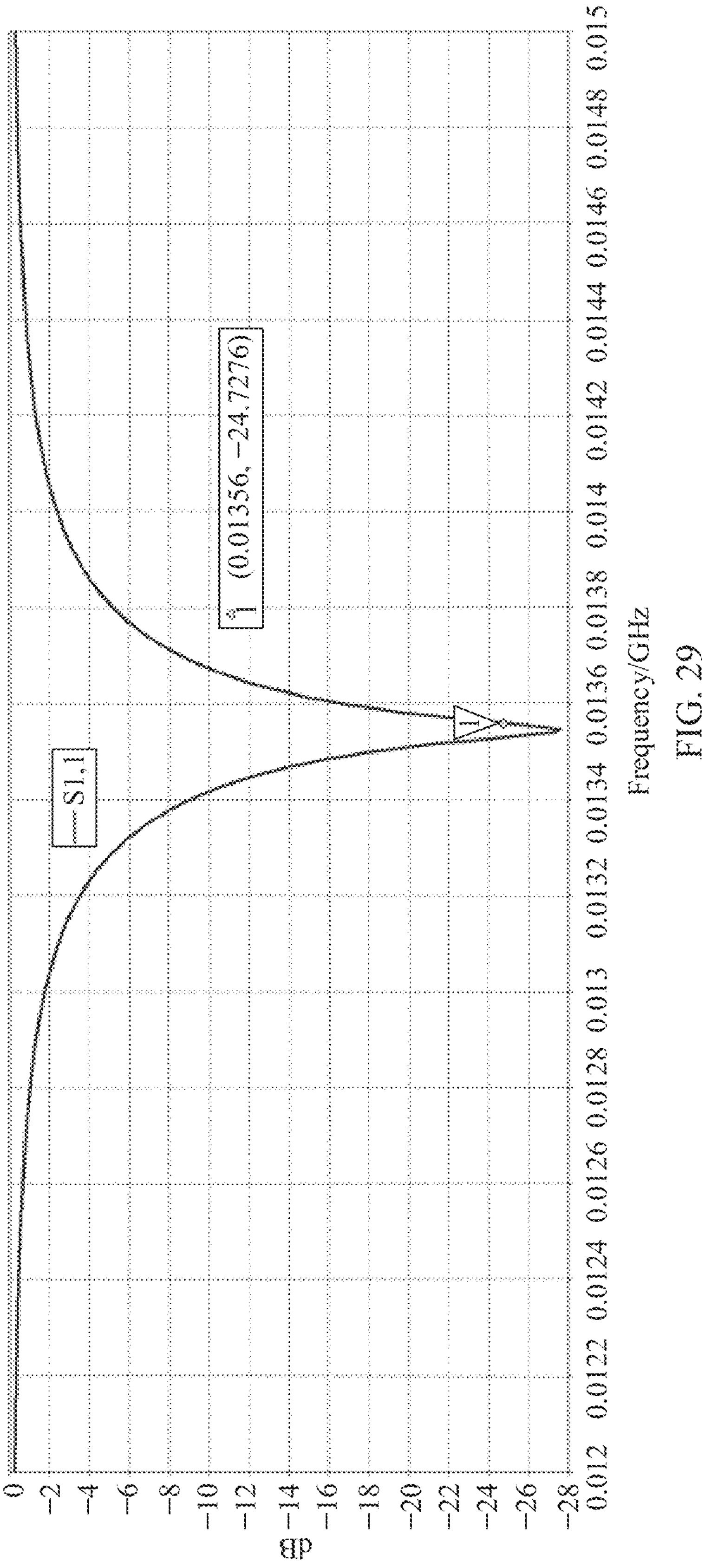
FIG. 29 is a diagram showing a return loss curve of an NFC antenna when an NFC coil includes a first part and a second part, and a through-hole is provided in a metal member, according to an embodiment of this application.
Figure 30:
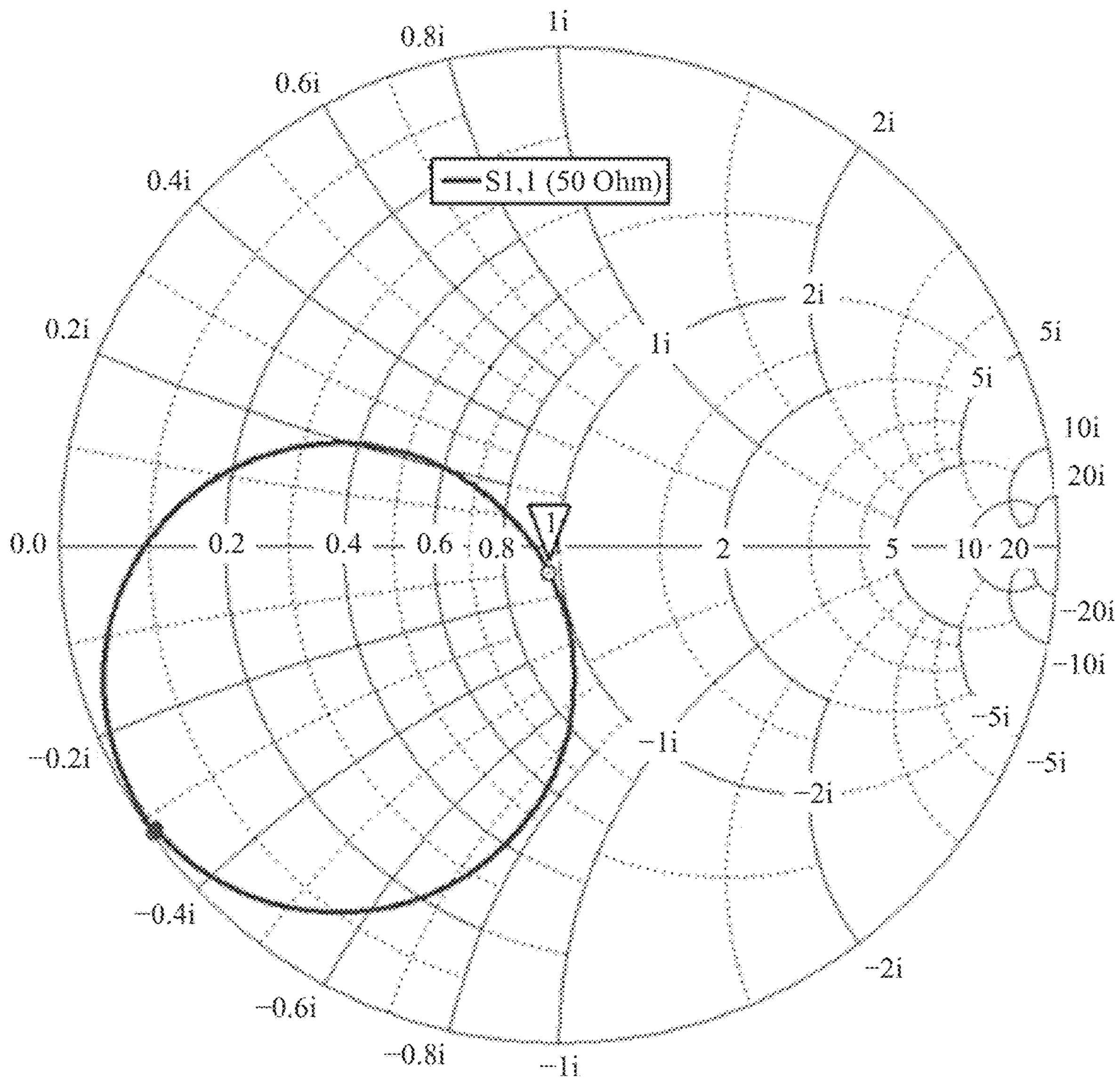
FIG. 30 is a Smith chart of an NFC antenna when an NFC coil includes a first part and a second part, and a through-hole is provided in the metal member, according to an embodiment of this application.

FIG. 29 is a diagram showing a return loss curve of an NFC antenna 30 when an NFC coil 31 includes a first part 311 and a second part 312, and a through-hole 51 is provided in a metal member 50, according to an embodiment of this application; and FIG. 30 is a Smith chart of an NFC antenna 30 when an NFC coil 31 includes a first part 311 and a second part 312, and a through-hole 51 is provided in the metal member 50, according to an embodiment of this application. It can be learned from FIG. 29 and FIG. 30, an operating frequency of the NFC antenna 30 is 13.56 MHz, and a signal transmitting and receiving capability is good.

Figure 31:
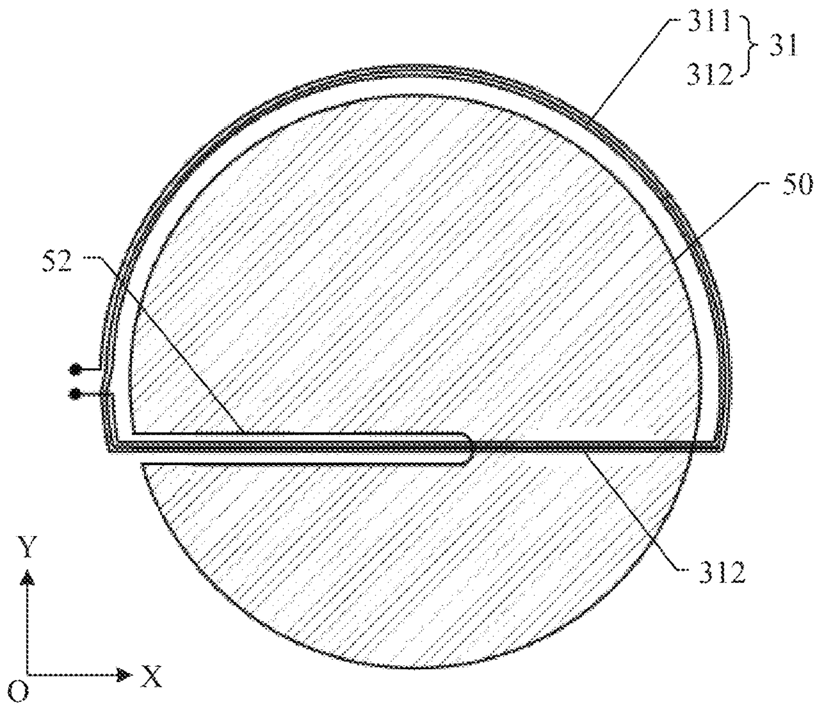
FIG. 31 is a diagram of a relative position of an NFC coil and a metal member according to some other embodiments of this application.

In some other embodiments, refer to FIG. 31. FIG. 31 is a diagram of a relative position of an NFC coil 31 and a metal member 50 according to some other embodiments of this application. In this embodiment, the metal member 50 is provided with the through-slot 52. The second part 312 overlaps an orthographic projection that is of the through-slot 52 and that is on the plane in which the NFC coil 31 is located, so that the second part 312 is exposed. That is, the through-slot 52 connects one side that is of the metal member 50 and that is close to the plane in which the NFC coil 31 is located and one side that is of the metal member 50 and that is from the plane in which the NFC coil 31 is located. A through-slot 52 is opposite to the second part 312 of the NFC coil 31, and the through-slot 52 penetrates through an edge of the metal member 50 along at least one end of the extension path parallel to the second part 312. In this way, the second part 312 of the NFC coil 31 can be exposed through the through-slot 52, so that the magnetic field generated by the second part 312 can be transmitted, through the through-slot 52, to the side that is of the metal member 50 and that is away from the NFC coil 31. Correspondingly, the second part 312 may also receive, through the through-slot 52, the magnetic field on the side that is of the metal member 50 and that is away from the NFC coil 31.

Figure 32:
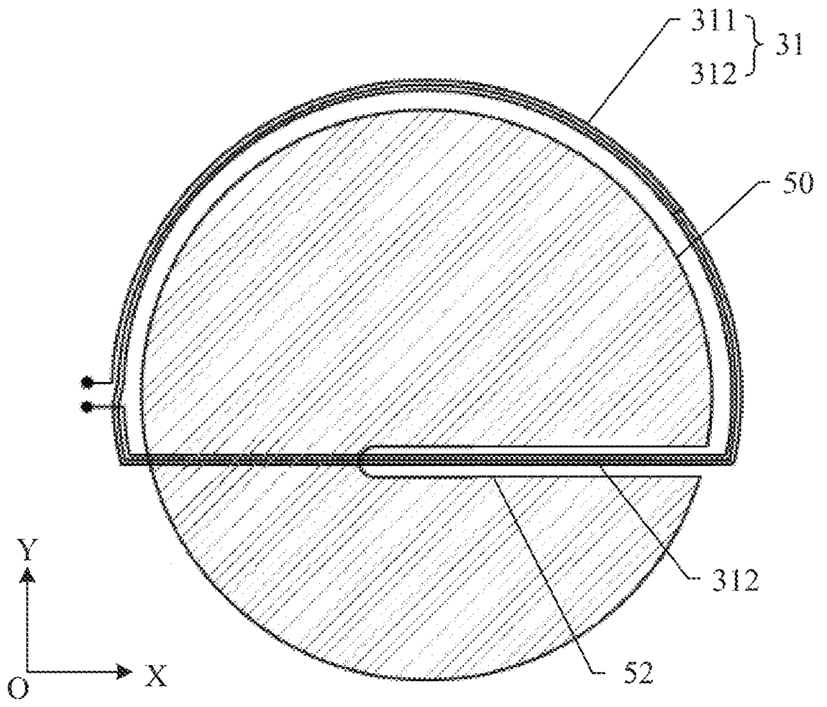
FIG. 32 is a diagram of a relative position of an NFC coil and a metal member according to some other embodiments of this application.
Figure 33:
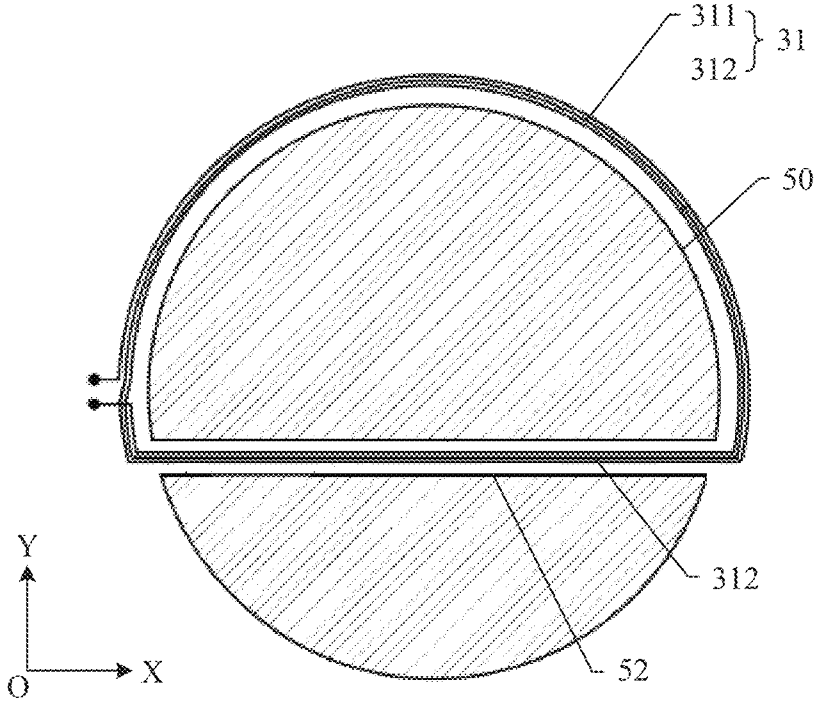
FIG. 33 is a diagram of a relative position of an NFC coil and a metal member according to some other embodiments of this application.

For example, referring to FIG. 31, the through-slot 52 penetrates through the edge of the metal member 50 along one end of the extension path parallel to the second part 312. For another example, refer to FIG. 32. FIG. 32 is a diagram of a relative position of an NFC coil 31 and a metal member 50 according to some other embodiments of this application. The through-slot 52 penetrates through an edge of the metal member 50 along the other end of the extension path parallel to the second part 312. For another example, refer to FIG. 33. FIG. 33 is a diagram of a relative position of an NFC coil 31 and a metal member 50 according to some other embodiments of this application. The through-slot 52 penetrates through an edge of the metal member 50 along both two ends of the extension path parallel to the second part 312.

It may be understood that the metal member 50 may be provided with only the through-hole 51, may be provided with only the through-slot 52, or may be provided with both the through-hole 51 and the through-slot 52. Specifically, the design can be carried out based on actual needs.

To ensure structural integrity or aesthetics of the metal member 50, in some embodiments, the through-hole 51 and the through-slot 52 are filled with an insulating material. The insulating material includes, but is not limited to, plastic, sponge, rubber, and silica gel, and this is not specifically limited herein.

Figure 34:
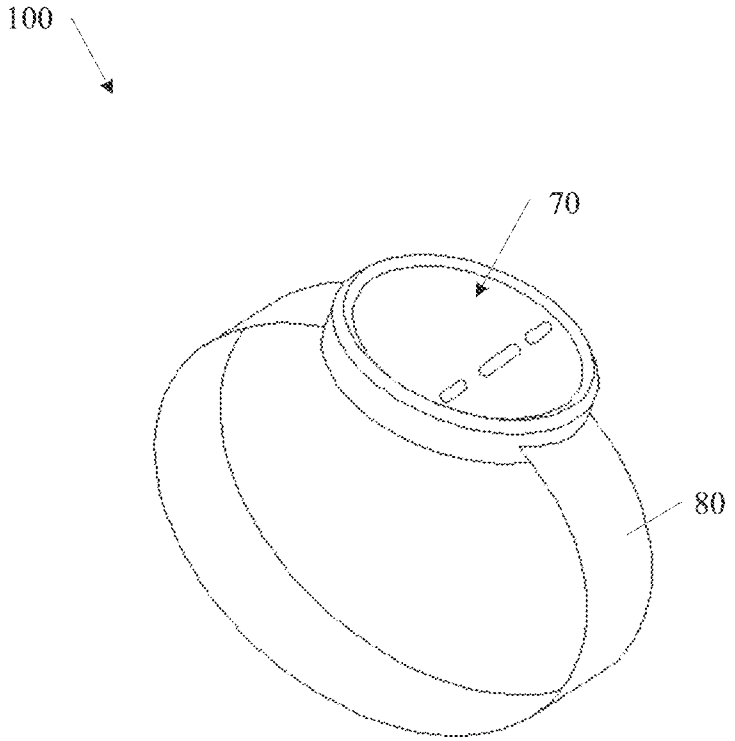
FIG. 34 is a schematic diagram of a structure of an electronic device according to some other embodiments of this application.

FIG. 34 is a schematic diagram of a structure of an electronic device 100 according to some other embodiments of this application. In this embodiment, the electronic device 100 is a smartwatch. The electronic device 100 includes a host 70 and a watch band 80.

It may be understood that FIG. 34 shows only some example components included in the electronic device 100, and actual shapes, actual sizes, actual positions, and actual structures of these components are not limited by FIG. 34.

A material of the watch band 80 include, but is not limited to, metal, nylon, and plastic.

Figure 35:
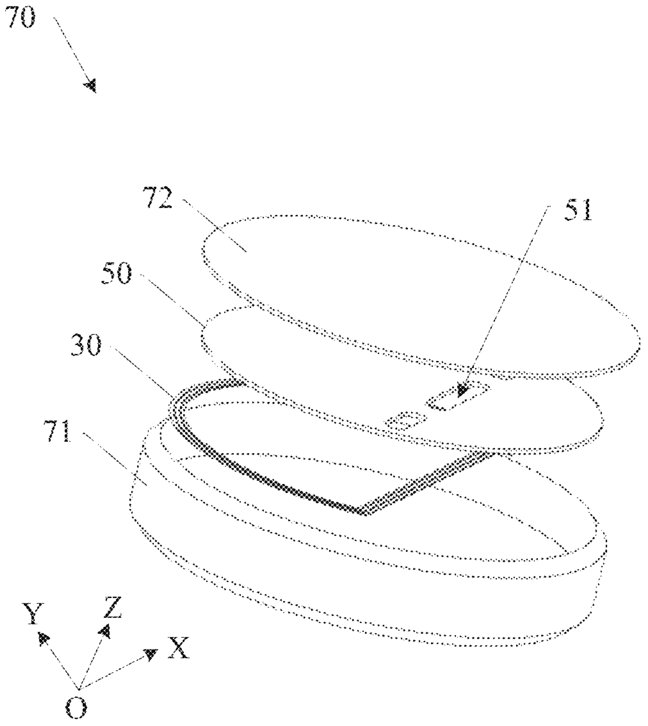
FIG. 35 is an exploded view of a host of the electronic device shown in FIG. 34.

FIG. 35 is an exploded view of a host 70 of the electronic device 100 shown in FIG. 34. In this embodiment, the host 70 includes a bottom housing 71, a light-transmitting cover plate 72, an NFC antenna 30, and a metal member 50.

The bottom housing 71 is fastened to the watch band 80. A material of the bottom housing 71 includes, but is not limited to, plastic and metal. The bottom housing 71 is configured to protect an internal electronic component of the smartwatch. A mounting slot is formed in the bottom housing 71. The light-transmitting cover plate 72 covers and is fastened at an opening of the mounting slot.

The NFC antenna 30 and the metal member 50 are mounted in the mounting slot. The NFC antenna 30 is configured to radiate a radio frequency signal to a side close to the light-transmitting cover plate 72, and to receive a radio frequency signal on the side close to the light-transmitting cover plate 72. The metal member 50 is located between the NFC antenna and the light-transmitting cover plate 72. In some embodiments, the metal member 50 is a dial of the smartwatch.

In this embodiment, a structure of the NFC antenna 30, a structure of the metal member 50, and a relative position of the NFC antenna 30 and the metal member 50 may be designed with reference to the structure of the NFC antenna 30, the structure of the metal member 50, and the relative position of the NFC antenna 30 and the metal member 50 in the embodiment of the mobile phone. Details are not described herein again.

In the descriptions of this specification, a specific feature, structure, material, or a characteristic may be combined in any one or more embodiments or examples in an appropriate manner.

Finally, it should be noted that the foregoing embodiments are only used to illustrate the technical solutions of this application, but are not used to limit this application. Although this application has been described in detail with reference to the foregoing embodiments, it should be understood by a person of ordinary skill in the art that the technical solutions described in the foregoing embodiments may still be modified, or some technical features thereof are equivalently replaced. These modifications or replacements do not make the essence of the corresponding technical solutions depart from the spirit and scope of the technical solutions of the embodiments of this application.

What is claimed is:

1. An electronic device, comprising:

a near field communication (NFC) antenna; and a metal member;

wherein the NFC antenna comprises an NFC coil, the NFC coil comprises a first side, and the first side is one side of a plane in which the NFC coil is located;

wherein the metal member is located on the first side, the NFC coil comprises a first part and a second part arranged along a circumferential direction of the NFC coil;

wherein the first part is located outside a first orthographic projection, the first orthographic projection belongs to the metal member and is on the plane in which the NFC coil is located, and the first part is provided around the first orthographic projection;

wherein the second part passes through the first orthographic projection;

wherein the metal member is provided with at least one through-hole, and a periphery of the at least one through-hole is closed; and wherein the second part overlaps a second orthographic projection, the second orthographic projection belongs to the at least one through-hole and is on the plane in which the NFC coil is located, and the second part is exposed.

2. The electronic device according to claim 1, wherein a sum of lengths of through-holes provided in the metal member in an extension path parallel to the second part is less than a length of the metal member in the extension path parallel to the second part.

3. The electronic device according to claim 1, wherein a sum of lengths of through-holes provided in the metal member in an extension path parallel to the second part is less than five-thousandths of a wavelength of the NFC antenna.

4. The electronic device according to claim 1, wherein the at least one through-hole is filled with an insulating material.

5. The electronic device according to claim 1, wherein the NFC coil further comprises a third part and a fourth part arranged along the circumferential direction of the NFC coil;

wherein along the circumferential direction of the NFC coil, the third part and the first part are respectively connected to two opposite ends of the second part, the third part is located outside the first orthographic projection, and the third part is provided around the first orthographic projection; and wherein along the circumferential direction of the NFC coil, the second part and the fourth part are respectively connected to two opposite ends of the third part, and the fourth part passes through the first orthographic projection.

6. The electronic device according to claim 1, wherein the NFC coil further comprises a second side, and the first side and the second side respectively are two opposite sides of the plane in which the NFC coil is located; and wherein the NFC antenna further comprises a magnetic shielding sheet, wherein the magnetic shielding sheet is provided on the second side of the NFC coil, the magnetic shielding sheet is stacked with the plane in which the NFC coil is located, a third orthographic projection belongs to the NFC coil and is on the magnetic shielding sheet, the third orthographic projection is located within the magnetic shielding sheet, and the magnetic shielding sheet is configured to increase magnetic field strength of the first side, so that the NFC antenna has signal transmitting/receiving directionality.

7. The electronic device according to claim 6, wherein the magnetic shielding sheet comprises ferrite.

8. The electronic device according to claim 1, wherein the electronic device further comprises a circuit board, and the NFC coil comprises a metal layer provided on the circuit board.

9. The electronic device according to claim 1,
wherein the metal member is a camera decoration cover; and
wherein the electronic device further comprises a back cover, the metal member is mounted on the back cover, and the NFC coil is located on an inner side of the back cover.

10. The electronic device according to claim 1,
wherein the metal member is a dial; and
wherein the electronic device further comprises a light-transmitting cover plate, the metal member and the NFC coil are located on an inner side of the light-transmitting cover plate, and the metal member is located between the NFC coil and the light-transmitting cover plate.

11. The electronic device according to claim 1,
the NFC coil is a plane coil
wherein the metal member is provided with a through-slot, the second orthographic projection belongs to the through-slot and is on the plane in which the NFC coil is located, the second part is exposed, and the through-slot penetrates through an edge of the metal member along at least one end of an extension path parallel to the second part.

12. The electronic device according to claim 11, wherein a sum of lengths of through-slots provided in the metal member in the extension path parallel to the second part is less than a length of the metal member in the extension path parallel to the second part.

13. The electronic device according to claim 11, wherein the through-slot is filled with an insulating material.

14. The electronic device according to claim 1, wherein the first side of the NFC coil is a signal transmitting/receiving side of the NFC coil.

15. The electronic device according to claim 1, wherein the metal member is a sheet, a block, or a plate.

16. The electronic device according to claim 1, wherein the first part extends along a straight line, an arc line, or a fold line.

17. The electronic device according to claim 1, wherein the second part extends along a straight line, an arc line, a fold line.

18. The electronic device according to claim 1, wherein the first part is provided outside multiple sides of the first orthographic projection that belongs to the metal member and is on the plane in which the NFC coil is located.

19. The electronic device according to claim 1, wherein a distance that is between the second part and the metal member that is perpendicular to the plane in which the NFC coil is located is smaller than a distance between the first part and an edge of the metal member.

20. The electronic device according to claim 1, wherein the NFC coil is a plane coil.

* * * * *